(12) United States Patent
Kleinbart et al.

(10) Patent No.: US 9,514,424 B2
(45) Date of Patent: Dec. 6, 2016

(54) SYSTEM AND METHOD FOR ONLINE COMMUNICATIONS MANAGEMENT

(76) Inventors: Kyle Kleinbart, Encino, CA (US); Rory Handel, Los Angeles, CA (US); David Tessel, Riverdale, NY (US); Sam Chiu, Palo Alto, CA (US); Jean Pascal Crametz, Palo Alto, CA (US)

( * ) Notice: Subject to any disclaimer, the term of this patent is extended or adjusted under 35 U.S.C. 154(b) by 998 days.

(21) Appl. No.: 13/341,580

(22) Filed: Dec. 30, 2011

(65) Prior Publication Data
US 2012/0278388 A1 Nov. 1, 2012

Related U.S. Application Data

(60) Provisional application No. 61/428,712, filed on Dec. 30, 2010.

(51) Int. Cl.
*G06F 15/16* (2006.01)
*G06Q 10/06* (2012.01)
*G06Q 10/10* (2012.01)

(52) U.S. Cl.
CPC .............. *G06Q 10/06* (2013.01); *G06Q 10/10* (2013.01)

(58) Field of Classification Search
CPC ..................................... G06Q 10/06
USPC .......................................... 709/204
See application file for complete search history.

(56) References Cited

U.S. PATENT DOCUMENTS

| | | | |
|---|---|---|---|
| 2006/0080267 A1 | 4/2006 | Nelken | |
| 2007/0005413 A1* | 1/2007 | Hennings et al. | 705/9 |
| 2007/0033085 A1 | 2/2007 | Johnson | |
| 2009/0006366 A1* | 1/2009 | Johnson et al. | 707/5 |

OTHER PUBLICATIONS

International Preliminary Report on Patentability (IPRP) issued by the IPEA/EP Patent Office on Jul. 13, 2013 in connection with corresponding application PCT/US2011/068089.

* cited by examiner

*Primary Examiner* — Joseph Greene
(74) *Attorney, Agent, or Firm* — Ostrolenk Faber LLP

(57) ABSTRACT

A system and method are disclosed. One or more processors prioritize at least some tasks and actions associated with a user. A to-do list is provided that includes the prioritized task. First electronic data event information representing a sending or receiving of data associated with at least one of the tasks is received and at least one of the tasks and at least some of the actions are reprioritized. The to-do list is modified based at least on the reprioritizing, and is provided to the user.

18 Claims, 16 Drawing Sheets

Fig. 3

SYSTEM AND METHOD FOR ONLINE COMMUNICATIONS MANAGEMENT

RELATED APPLICATION

This application is based on and claims priority to U.S. Provisional Application Ser. No. 61/428,712, filed on Dec. 30, 2010 and entitled "SYSTEM AND METHOD FOR ONLINE COMMUNICATIONS MANAGEMENT," the entire contents of which are hereby incorporated by reference.

BACKGROUND

Field

The present application relates, generally, to communications and, more particular, to managing and integrating remote communications in connection with personal and professional productivity.

Description of the Related Art

Currently, many people use a plethora of devices, tools and formats to communicate with each other. Cellular telephones, personal digital assistants, smart-phones, facsimile machines, e-mail, chat, SMS and voice over IP ("VOIP"), for example, are used by individuals to communicate. Too many isolated tools are needed to complete tasks, resulting in inefficiency and ineffectiveness. The ability to manage and/or track such communications is difficult at least because communication is dispersed across too many media. Too much time is wasted deciding what people need to do and when people need to do it.

Moreover, discerning how to prioritize a plurality of communications is currently difficult. Much information that is communication between parties may be understood between the parties at a particular time to have particular significance, but other parties monitoring such communication, or the same parties over time may not be able to prioritize communications adequately.

Further, the various tools, devices and formats currently in use for communication often provide unnecessary and undesirable redundancies. Currently, there is no adequate way to consolidate different communications that may relate to a single or particular task.

SUMMARY

The present application provides a system and method for reduction, prioritization and consolidation associated with communication, including the tools, devices and formats of the communication, as well as the messages and discussions that are transmitted thereby. This is provided, at least in part, by providing an active, automated to-do list for everything that enters and exits a person's workflow environment, including by consolidating respective tasks that may need to be completed, paired with the tools needed to complete each task. This results in a removal of barriers that block activity and productivity.

BRIEF DESCRIPTION OF THE DRAWINGS

For the purpose of illustrating the invention, there is shown in the drawings several forms, which are presently preferred, it being understood, however, that the invention is not limited to the precise arrangements and instrumentalities shown. The features and advantages of the present invention will become apparent from the following description of the invention that refers to the accompanying drawings, in which:

FIG. 3 shows an example display that includes features provided in accordance with an example embodiment;

DESCRIPTION OF THE EMBODIMENTS

Figure 1:
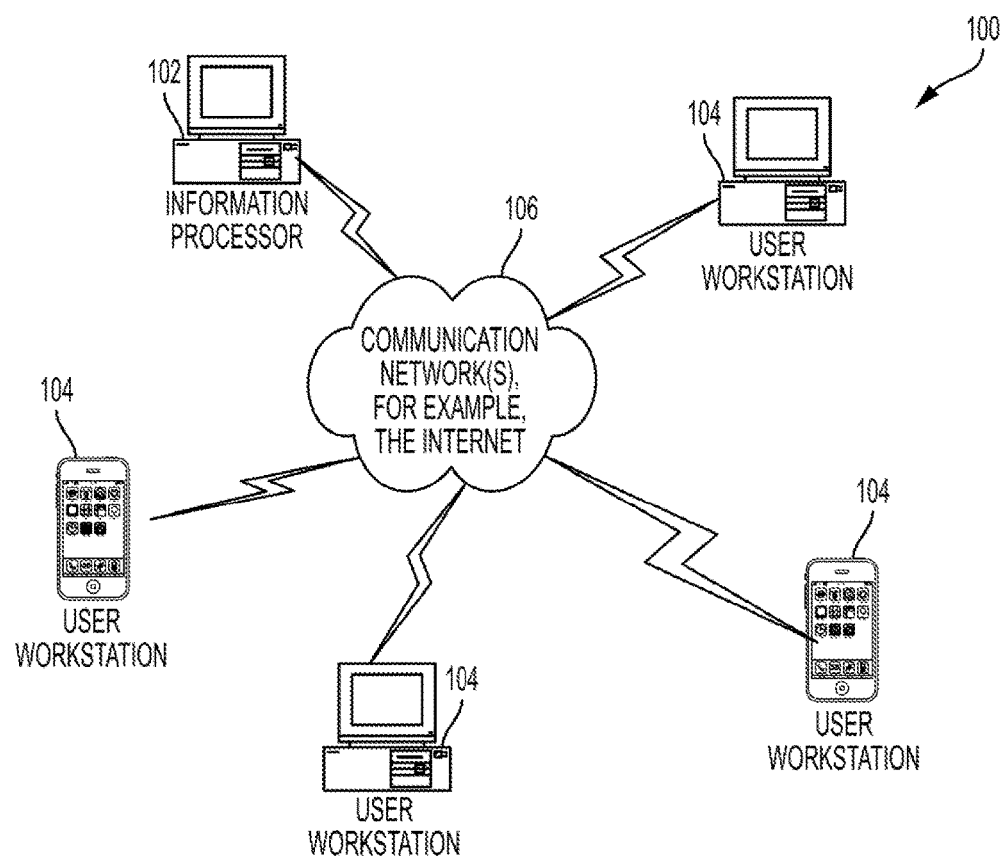
FIG. 1 illustrates an example hardware arrangement, in accordance with an embodiment of the present application.

In an embodiment, a productivity network is disclosed that supports a network of people who are connected, for example, to one or more sets of tasks, and who have tools necessary to complete each task. The productivity network in accordance with the present application dramatically increases efficiency of task completion over known systems and methods. As used herein, the term, "task," refers, generally as something that needs to be completed by the user. For example, a task may be as simple as answering a message, writing a document, or attending an event. Also as used herein, the term, "data-event" relates to a transmission of data, and may represent any way that data are sent and received. For example, data may be transmitted via an API, via a well-known protocol, via a proprietary protocol, via user data entry (including by selections made in response to prompts), and via analog sources. Data-events may trigger correlating processes by a computer. Also as used herein, the term, task-action refers to things that are performed by users, or substantially automatically for the accomplishment of tasks. Moreover, as used herein the term, "task-generation" relates to things that are performed by users or substantially automatically for the creation of tasks. The productivity network provided in accordance with the teachings herein may be implemented in an Internet web-based environment that provides users with access to tools that may be necessary to complete their tasks. For example, the web-based environment supports an interactive communications portal, document, spreadsheet, CAD and presentation creation, viewing tools and calendar-related functionality.

The tools disclosed herein may be provided to take advantage of real-time push technologies to improve collaboration for a plurality of users. The communications portal represents a technological breakthrough for organizational efficiency, for example, in the Internet-based communications sector.

In an embodiment, a core tool set is complemented by a revolutionary task manager that employs a prioritization algorithm that compares, for example, time intervals spent on actions that are of similar purpose (size or end result), distance and time between physical locations, and real-time prioritization of communication access to maximize the efficiency of task completion. The core tools set performs at least some of the equivalent functionality of a qualified personal assistant who decides what is needed to do and when it is needed to do it, and who can perform some task-actions for the user, such as making travel or restaurant or entertainment reservations by interpreting conversations, with diminished (or, in some cases, without) user participation with timesaving goals in mind.

The teachings herein may also be characterized as a productivity operating system. Through an extensive SDK (Software Developers Kit), consisting of line-optimized API's, developers are able to incorporate other tools (programs) or items (materials) that help individuals or large organizations complete niche specific tasks in the most efficient manor possible. Third-party tools may be offered for purchase through, for example, an in-platform application store.

The productivity network is preferably web-based, but may also extend to popular mobile platforms through mobile-formatted sites and in-house mobile applications. Alternatively, the teachings herein may be provided as a desktop application as well, for example, for enterprise use.

The platform in accordance with an embodiment of the present application provides an API for integrating Audio/Video Call functionality. Also, functionality may be provided to integrate or launch screen sharing as a tool in support of a task-action. Further, and in connection with screen sharing, an embodiment of the present application may provide API calls for screen sharing. The application may allow a user to launch a screen sharing session, for example to invite other users by email. Also, a user may record data/communication sessions or enable at least one other participant to function as a presenter.

Moreover and in connection with a mobile platform, the application may provide one or more client applications with support for audio/video, as supported by corresponding phones. The application supports one or more of the following phone platforms, or another of like kind. ANDROID MOBILE/TABLET; IPHONE/IPAD iOS; BLACKBERRY; AND WINDOWS MOBILE. These phones may be called directly by the administrator of the conference, or may join a conference by connecting to the conference through the mobile application.

In connection with web browser software applications, the present application supports many applications, including web browser software applications that include a FLASH plug-in, HTML or any display-rendering language, or other multi-media supporting tools.

In connection with a chat application, the present application may provide integration with popular instant messaging ("IM") networks, such as GTALK/MSN MESSENGER/YAHOO/AIM/ICQ/FACEBOOK/MYSPACE. One or more of the following API calls may be provided or otherwise available. LinkAccount; GetBuddyList; SendMessage; ReceiveMessage; SubscribeUpdates; and RemoveAccount. In connection with a server side API, various server side API calls may be provided via standard Internet web services, which may be may be consumed either in various open source platforms, such as PYTHON, or in proprietary platforms. Accordingly, the present application may provide web services, without a need to support or otherwise provide language-specified API's.

In an embodiment, documentation that may be published on the Internet is provided for API calls along with sample code for a client side and/or a server side API. Moreover, API testing and support may be provided for integration on an on-going basis. For example, for various platforms, invitations may be created and sent to any platform for users to join. An example is WEBEX.

Thus, the present application provides one or more APIs for integrating audio/video chat functionality. Also, functionality is provided to integrate or launch screen sharing. A client API, for example, using HTML5 and Bandwidth Dispersion application(s) may be provided and installed on a user's computer to optimize bandwidth usage. For example, an installable application may be provided for client computers. Video/audio feeds may be broadcast peer to peer, as long as bandwidth is available on client's PC. In the event there is not enough bandwidth the application utilizes one or more servers for broadcasting video/audio feeds.

Moreover, APIs for virtually unlimited web browser and mobile for example (Android/iOS/RIM) HD HTML5/CSS3/Web-Kit-based group video conferencing with video and audio recording are provided. The present application may include a bandwidth dispersion technique, and A→B analytics for video chat usage. Further, cross-platform integration is supported for video chat, and users may be able to video chat with people using exterior services as well as within one or more "interior" web and mobile applications. This may include exterior services that may or may not contain native video chat support. Examples include AIM/ICHAT, GCHAT/GOOGLE applications, FACEBOOK chat/messaging, SKYPE, native ANDROID video chat (activated by calling phone number), FACETIME/IOS (activated by calling phone number), native RIM video chat client (activated by calling phone number), native WINDOWS mobile video chat (activated by calling phone number), native WINDOWS 7 video chat client/LYNC, native EXCHANGE video chat client (if applicable), native LOTUS client (IBM Same time) (if applicable), and WEBX desktop client (if applicable).

In an embodiment, video is provided in accordance with a user's computing device's skin/size preferences, and data-events associated with video are accessed. Maximum quality video capable of being supported by user's device, such as 1080p "HD video" resolution or higher may be supported, as well as respective descending quality offerings (e.g., 720p). Additionally, a surround-sound and/or stereo mechanism may be provided, and noise interference cancellation and/or optimization may be provided for transmitting audio of people during an audio or video call session.

The present application further supports desktop sharing and control substantially in real time. Moreover, video from sites, such as YOUTUBE may be played, and other embedded links which can be seen by a plurality of users, for example in an on-line or virtual conference, are selectable. Preferably, a video and/or audio session is supported per conference, which can be heard and/or seen by parties participating in the conference. The application further provides the ability to share video/audio/images within a conference, and to display custom visual elements within videoconference such as drawing or laser pointing. Other features include a server-side library, such as for Python and Go. Moreover, video chat functionality is supported by various browsers, including, for example, Chrome, IE6+ (Chrome Plug-In), Safari 3+, Firefox 3.5+ (Gecko), Opera, Safari Mobile Browser, Chrome Mobile for Android, Blackberry Mobile Browser, iOS—for IPAD/IPHONE, GINGERBREAD/HONEYCOMB/ICE-CREAM-SANDWICH—for ANDROID MOBILE/TABLET, RIM OS, OSX AND WINDOWS 7.

The present application may receive incoming data-events from a number of APIs, as well as from direct analog voice transmissions (e.g., voice mail and/or telephone conversations) and uses an API function to do a voice-to-text translation. That text may be used by another API-supplied service such as SEMANTIC INTERPRETATION, which in turn drives other functions. Thus, other data-events may arrive over a telephone line.

It is recognized by the inventors that most corporate/enterprise users use cellular telephones when away from their desks. While at their desks, however, they use land-based telephones, as well as corporate networks for laptops or desktops. The present application provides availability of these feeds, as well.

In an embodiment, the interposition of a splitter may include sockets for a phone/data system. In an embodiment, it is installed by unplugging the phone cord on the back of the phone, and plugging it into the appropriate socket on the splitter. Corresponding physical short cords may be then plugged into both the splitter and the desktop or laptop computers, so that the acquisition of data-event streams may be accomplished. A Bluetooth or an equivalent transmitter may also be incorporated into the splitter.

The present application supports optimal voice protocol selections, including for backward-compatible voice devices. For example, the present application provides the ability to select an optimal voice protocol method by comparing cellular and landline reception quality with VoIP Web-based connection quality. In an embodiment, a mobile device's cellular quality may be examined by analyzing reception bars and mobile Internet access (Edge/3G/4G, and so on) provided by data-events accessed, as described herein. Data-events may be converted for the purpose of analyzing voice quality, and cellular data-events may be accessed via native APIs or through short code carrier functionality.

In an embodiment, the data-events and voice quality analysis from the cellular service is monitored and compared to the VoIP quality analysis (accessed through APIs), and the optimal protocol is selected when a user places or receives a call from the mobile device, and is continually checked for updated selection by pushed API calls for optimal quality throughout the call.

In an embodiment, a backwards compatible voice device (hardware module), equipped with a standard CAT-5 and/or a RJ-9 phone line connection (input and output), Ethernet/LAN connection (input), Wi-Fi support (output), and a physical connection such as USB 3.0 (output) or Thunderbolt I/O (output) or an equivalent connection, is supported that connects to a Computer-based peripheral for data-event transfer, audio transfer, plug-in installation, and power reception.

The backwards compatible voice device may allow for a realtime quality comparison between the phone line connection and the VoIP connection (Ethernet or Wi-Fi). In an embodiment, a computer plug-in proceeds to install upon connecting the device to the computer (e.g. USB 3.0 or Thunderbolt I/O), preferably when permission is received from the user, in order to obtain future data-events from the input connection(s) in the form of voice quality information and content recollection. When two or more inputs are connected, the optimal connection is selected for the browser-based computer user by applying the same algorithm used for optimal mobile voice protocol selection.

Users connected to the mobile and browser-based application and the backwards compatible voice device receive preferred optimal reception selection with all the following connections being compared at maximum: cellular, mobile VoIP (e.g. Edge/3G/4G, and so on), phone line (e.g. CAT-5 or RJ-9), and for example Ethernet or Wi-Fi VoIP. Incoming telephone calls may be made first available through the optimal device through the optimal protocol, with the call being momentarily delayed and routed to the alternate device through the optimal protocol. All outgoing calls may be processed by the optimal protocol through the selected device.

Referring now to the drawing figures, in which like reference numerals represent like elements, FIG. 1 illustrates an example hardware arrangement in accordance with an embodiment of the present application. Referred to generally, herein, as system 100, the arrangement provides for monitoring and notification services in accordance with the teachings herein. System 100 includes at least one information processor 102 (configured to operate as an Internet web server and/or database file server) that is programmed and configured to access communication network 106 and communicate with computing device(s) 104. Computing devices 104 may be personal computers, and may further be mobile devices, such as one or more of the GOOGLE ANDROID, APPLE IOS, WINDOWS MOBILE operating systems, and may include smartphone devices, tablet computing devices, or other mobile portable devices. Computing devices 104 and information processor(s) 102 may communicate via the known communications protocol, Transmission Control Protocol/Internet Protocol "TCP/IP." Information processor 102 and computing device(s) 104 preferably are provided with or have access to all databases necessary to support the present application.

Communication network 106 is preferably a global public communication network such as the Internet, but can also be a wide area network (WAN), local area network (LAN), an intranet or other network that enables computing devices and peripheral devices to communicate.

In a preferred embodiment, information processor(s) 102 and computing devices 104 may be equipped with web browser software, such as MICROSOFT INTERNET EXPLORER, MOZILLA FIREFOX, GOOGLE CHROME, APPLE SAFARI or the like. Information processor 102 and computing devices 104 are coupled to communication network 106 using any known data communication networking technology.

Figure 2:
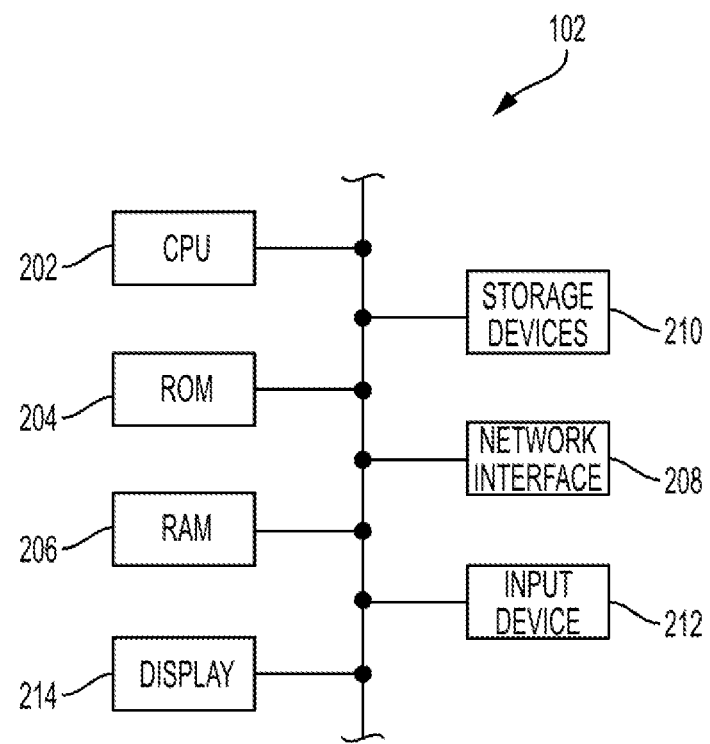
FIG. 2 illustrates functional elements, of which one or more may be configured in a computing device, in accordance with an embodiment.

FIG. 2 illustrates functional elements, of which one or more may be configured in an example information processor 102 and/or computing device 104. The functional elements shown in FIG. 2 include one or more central processing units (CPU) 202 used to execute software code and control operations. Other elements shown in FIG. 2 include read-only memory (ROM) 204, random access memory (RAM) 206, one or more network interfaces 208 to transmit and receive data-events to and from other computing devices across a communication network, storage devices 210 such as a hard disk drive, floppy disk drive, tape drive, CD ROM or DVD for storing program code databases and application data-events, one or more input devices 212 such as a keyboard, mouse, track ball, microphone and the like, and a display 214.

The various components illustrated in FIG. 2 need not be physically contained within a single device chassis or even located in a single location. For example, storage device 210 may be located at a site that is remote from the remaining elements of information processor 102, and may even be connected to CPU 202 across communication network 106 via network interface 208. Information processor 102 and/or computing device 104 may include a memory equipped with sufficient storage, such as to provide or access the necessary databases, forums, and other community services communicating hypertext markup language (HTML), Java applets, and/or Active-X control programs. Information processor 102 and/or computing device 104 are arranged with components, for example, those shown in FIG. 2, suitable for the expected operating environment. The CPU(s) 202, network interface(s) 208 and memory and storage devices are selected to ensure that capacities are arranged to accommodate expected demand.

The nature of the present application is such that one skilled in the art of writing computer executable code (i.e., software) can implement the functions described herein using one or more of a combination of popular computer programming languages and developing environments including, but not limited to, C, C++, Visual Basic, JAVA, HTML, XML, ACTIVE SERVER PAGES, JAVA server pages, servlets, MYSQL, PHP and RUBY ON RAILS.

Although the present application is described by way of example herein and in terms of a web-based system using web browsers and a web site server (e.g., information processor 102), system 100 is not limited to such a configuration. It is contemplated that system 100 is arranged such that information processor 102 and/or computing devices 104 communicate with and outputs data-events using any known communication method, for example, using a non-Internet browser WINDOWS viewer coupled with a local area network protocol such as the Internet Packet Exchange (IPX), dial-up, third-party, private network or a value added network (VAN). Moreover, information processor 102 and/or computing devices 104 may communicate via an application developed to run on the iOS or ANDROID operating systems.

It is further contemplated that any suitable operating system can be used on information processor 102 and/or computing device 104, for example, DOS, WINDOWS 3.x, WINDOWS 95, WINDOWS 98, WINDOWS NT, WINDOWS 2000, WINDOWS ME, WINDOWS CE, WINDOWS POCKET PC, WINDOWS XP, WINDOWS VISTA, WINDOWS 7, MAC OS, UNIX, LINUX, PALM OS, POCKET PC, BLACKBERRY, ANDROID, IOS, WEB OS and any other suitable operating system.

In an embodiment, the network functions on many if not all scales by being decentralized. In an embodiment, people create a scaled-back personal productivity network for individual use or, alternatively, a full-scale productivity network for use in large organizations such as corporations or universities. Private networks provided by the teachings herein may be provided on a central server for SaaS functionality (i.e. server is provided at a remote service bureau data center) or, alternatively, may be on a server appliance in an enterprise. In yet another embodiment, networks may be integrated through a licensed offering operating in existing organizations, such as via one or more firewall-protected intranets. The latter two enterprise offerings may be managed by one or more remotely provided support teams, an organization's internal IT department, or a combination thereof.

Proprietary Functionality

In an embodiment, a communications portal is provided that is effectively a consolidation of Internet-related communication protocols. An ability to organize existing and future conversations occurring through different methods and/or services is provided via a synchronization of various Internet communications protocols and/or messaging API's (Application Programming Interface), which may maintain SSL Encryption (Secure Sockets Layer) and/or TLS Encryption (Transport Layer Security) or the like. Such protocols may include IMAP (Internet Message Access Protocol), POP (Post Office Protocol), XMPP (Extensible Messaging and Presences Protocol)/IM (Instant Messaging), VoIP (Voice over Internet Protocol), SMS (Short Message Service)/MMS (Multimedia Messaging Service), Messaging API's (Facebook, Gchat, AIM, Skype, or the like), and/or IP videoconferencing.

Moreover, literal text-based conversations that are accessed through standard Internet protocols or proven API's are preferably funneled and specifically threaded to a user or users to which the conversation originated and/or applies. In one example, a category of "no subject conversations" is supported, in which users may create topics to further organize conversations. Such topics may then be tagged to one or more respective tasks. For example, the topic may be provided in a "subject line," as known in the art. The effect that arises is one where conversations, regardless of where occurring, are sortable based on one or more criteria, such as by one or more persons, or by task in which discussion is relied upon for completion.

In the instance where a conversation occurs via VoIP or IP videoconferencing, the conversation is preferably recorded and transcribed to text, so the conversation can be appropriately threaded and/or indexed.

In one or more embodiments, speech-to-text translation is provided for calls that are made or received by a user's telephone (e.g., cellular phone or smartphone, or landline). In one embodiment, the provider of the teachings herein supplies telephone hardware to users. In addition, speech-to-text translation may be provided for voicemail. Additionally, speech-to-text translation may be provided for IP videoconferencing, in-network VoIP calls, and voicemail left on users' personal phone numbers on their mobile devices. In an embodiment, task-specific, or conversation-specific vocabulary may be added by user(s) to improve speech-to-text translations. Semantic analysis may function as an accessory to the speech-to-text translation by identifying keywords that trigger one or more operations. For example, by mentioning the word "reservation or "restaurant", a reservation system API (OpenTable, for example) may automatically open in which the Coordinator (as described herein) automates scheduling, including by recognizing dates/times. This may occur through semantic analysis interpretation of speech-to-text translation, or text-based messages, with which the Coordinator will recommend optimal dates/times according to common available time-slots that may also be similar or equivalent to any dates/times, such as described herein.

Moreover, parallel semantic analysis of outgoing e-mails may also be performed. The results can then be used for a variety of purposes, such as for categorization of e-mail into a specific conversation stream, or the generation of one or more tasks in the to-do list.

In an embodiment, the communications portal supports contacting users. Due to the integrated nature of the synchronization aspect, the system and method herein prioritizes the best way to contact users or otherwise reach someone whether using any number of various communication tools at any given moment. In an embodiment, prioritization occurs as a function of whether or not a conversation is related to a task or is categorized as a "no subject" field. If the conversation is being continued or initiated and is related to a task, the present application may first check whether or not the user is available "online." For example, a messaging API integration from one or more 3rd party services may allow users to be contacted whether or not they are physically using the productivity network. If a user can be reached immediately via a particular method, for example, the user is on-line and reachable via SMS, e-mail, chat or similar medium then that method will have the highest priority. If the user is not available on-line, attempts to reach the user using all methods possible in a chronological (or manager ordered, or user-ordered) fashion. If, alternatively, the discussion relates to a task, the present application checks the characterization of the people involved in the task (see, for example, a discussion of a prioritization algorithm below) to decide which method is most appropriate. For example, if one were trying to contact a person with "Executive" characterization, the method that would be chosen first would be one that is more formal in nature, if that user is not directly online. For example, the formal method may be VoIP audio call. The following is a standard priority of how a user may be reached: Instant Message, SMS/MMS, Offline Message (can be bi-directional email) and audio/video messaging. In an embodiment, if one method is unsuccessful, the next method is automatically selected, and the original method may be erased.

In an embodiment as many data-events as possible from users' existing services are imported to make a transition into a platform provided in accordance with the teachings herein smooth and apparently seamless. Thus, in accordance with the present application, when a user provides access to their existing IMAP/POP or various other email, SMS and similar accounts, a method is provided for threading IMAP/POP and the various other services' transferred data-events. This may thread all past e-mail conversations based off the origin of the message. Moreover, the origin may be a single person, a group of people, organization, or the like. Further, existing e-mail subjects are preferably converted to topics, and users can then tag topics to a specific existing task or turn the subject of a past (most likely recent) e-mail into a new task that needs task-actions. The tools are then provided to complete the task. If a past e-mail contains an attachment, the attachment is preferably copied into the user's (users') document database for future access.

Prioritization Algorithm

The platform provided in accordance with the teachings herein may include a set of relational databases, as known in the art. Data-events, such as relating to users' conversations, events, and documents are stored therein and prioritized at the core level. The task manager may prioritize when task-actions may need to be taken by analyzing a set of data-event points over time in combination with a taxonomy based hierarchy. Furthermore, in some instances first and second derivatives of graphs are analyzed to determine the most efficient/effective prioritization/automation method.

With regard to an embodiment for prioritization in the context of time intervals relating to a task, the following is examined: time spent on messages of similar size (character amount); time spent on messages of similar purpose (discussing a document for example); time spent on document creation in similar instances; time spent working on similar tasks (characterized by matching keywords in the task description for example) with similar or different users; time and distance between locations (using traffic/mapping API's); efficiency of arrival at events using mobile check-in technology; and time spent on similar task sets depending on time of day and/or the day of the week.

The prioritization aspect may also perform a dynamic change in a user's to-do list, depending on the type of device that the user is working from. For example, there are some tasks that are more easily completed on a mobile device opposed to a desktop machine, and vice versa.

Prioritization of messaging may also occur in relation to the characterization of the user or group of users being messaged. This characterization is preferably taxonomic in nature and may be fueled by a set of meta-tags that are assigned to a user. These meta-tags may be the working position of that user. By doing this, messages that are from executives, for example, are placed above that of co-worker, in an automated fashion.

There is also an automation aspect to creating data-events. A lucene or sphinx or similar search, as known in the art, may be used for a predetermined set of subjects for the purposes of task-generations and API access. For example, terms that relate to a user wanting to set up a calendar date are viewed, and then recommended that this be scheduled in a user's to-do list. If the date is recognized to regard a lunch appointment for example, access is provided to an Open Table API so users can make reservations directly.

With regard to document creation, a search algorithm may be provided for web-based information databases, such as provided by WIKIPEDIA or WOLFRAM ALPHA, and that provides users with research related to the subject of the task needing completion. Furthermore, users may drop a graphical screen control, such as a button, into a web browser toolbar to provide bookmarking for research, as well as to link directly to a task needing the assistance of information for completion.

Enterprise Security

One or more security requirements are provided, such as but not limited to: SSO (Single sign-on); SSL/TSL Encryption; LDAP Integration (Lightweight Directory Access protocol)

24/7 support; up-time (e.g., 99.9%).

The productivity network according to the teachings affords advantages provided by an integrated system, which is unlike existing task management applications that provide a fragmented approach. Unlike known systems, a network of people are guided by the teachings herein as a function of a set of tasks that are complemented by the tools for completing the tasks. In an embodiment, a tool relates, generally, to an application that produces a set of interactive or static data-event sets that come together to create a focused database.

The integrated nature of the teachings herein caters towards database expansion, such that $3^{rd}$ party developers are able to create fully functional tools (including databases) that integrate with the platform. This represents a significant improvement over existing productivity suites because the platform provides for integration of tasks that can be prioritized, specifically for each user.

Moreover and unlike existing task management systems, the teachings herein do not rely exclusively on a user to determine the priority of his/her tasks. The application provides a learning system that may frequently optimize particular tasks that a user needs to complete and when.

Figure 5:
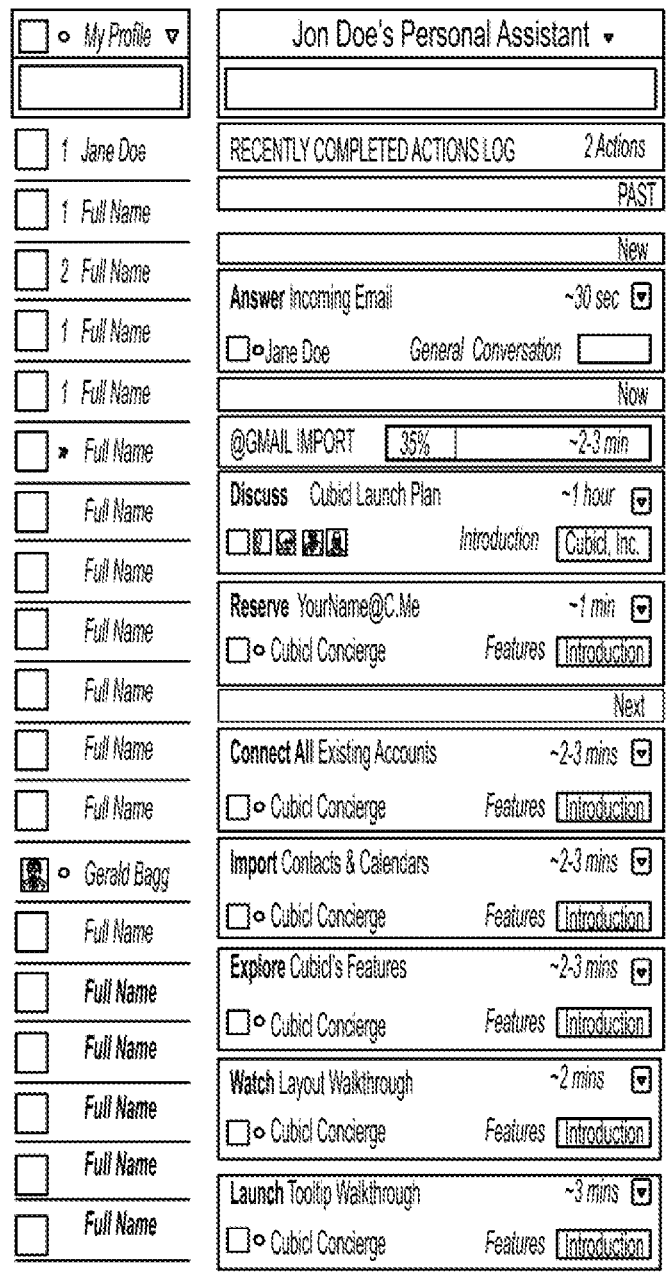
FIG. 5 shows another example display that includes features provided in accordance with an example embodiment.

Furthermore, existing task management solutions, which may be standalone or may exist within productivity suites, rely on the user to fill the data-event sets (tools) with his/her relevant information. The present application may import data from existing services, so the users can begin improving productivity efficiency at the onset of their use of the application. Unlike known data importing applications, the present application includes importing data-events from internet mail protocol (email), and when a user gives permission to access his/her existing email server (service), all communication is sorted, for example, according to the sender and relevancy (date). Within these sender-centric threaded conversations are subjects in existing emails, which become topics that users can convert to tasks, and which are then supported by the respective databases (tool)

that allow the user to complete each task. Moreover, one or more tools are preferably provided for attachment(s) that require task-actions. For example, see FIG. 5.

Also and unlike known communication databases that exist either as a standalone service, or within a Productivity Suite or Web-based platform, the teachings herein integrate multiple communication protocols into a single chronological thread that is either linked to an individual, a set of individuals, or a specific task. More specifically, conversations occurring on or as a function of the teachings herein can start from and continue on one or more of the following: Internet Mail Protocol, XMPP (Instant Message) protocol, Voice over Internet protocol, short messaging service, multimedia messaging service, video conferencing, and standard cellular protocol and similar communication mechanisms. For audio and video communication streams, speech-to-text recognition and facial recognition may also be provided to help aid the learning algorithm that prioritizes a user's to-do list.

Thus, many features and benefits are provided in accordance with the present application. In an embodiment, historical and substantially real-time data-events may be imported, accessed or otherwise obtained from one or more sources and protocols, such as IMAP, POP3, XMPP, SMS (Including History), MMS, Internet (e.g., Web) or Desktop-based Video Calls, Cellular Calling Data-Events, Document Storage, Landline Audio, Productivity Suites, and Social Networking Data-Events, etc. through an Application-Programming Interface (API). Moreover, data-events may be obtained through one or more suitable hardware devices, such as to provide prompt and current access to Internet or desktop based communication and collaboration data-events, including from legacy services and sources. Such data-events may be provided and/or maintained in a client-side environment and/or a server-side environment.

Moreover, legacy data-events that are hosted, for example, on third-party servers may be accessible in response to security credentials received from a user. For example, once a user is authenticated, use of a specific service's API or set of API's or other means of access to pre-existing data-events enables collection of relevant data-events for client-side user experience, in accordance with the teachings herein. Imported data-events may be used, for example, for determining the strength of relationships between the user and his/her contact list and/or to enable a prioritized response that takes account of such relationship strengths. In an embodiment, such determination may be made algorithmically and based on data-events collected from various sources, including e-mail accounts, cell-phone accounts, or the like. A ranking process may occur based on the data-events, and a user may opt to override default operations based on ranking, for example, by assigning higher or lower ranking values than those that may be otherwise derived algorithmically and/or automatically. By iterating through a plurality of assessments, information processor 102 effectively learns and improves the manner by which assessments and rankings occur. Thus the present application provides an advantage of immediately providing a positive experience (i.e., information processor 102 does not have to "learn" from experience derived from the moment of subscription). In an embodiment, proxy values that may relate to historical data-events of a particular user are accessed and used to generate starting values used for prioritizations for the particular user. Examples of proxy values include: identification of a user; task identification; data/time of each task; calendar history (label/organization-method, task, date/time, personal or group (creator or participant), individual or recurring); contact history, which may include a relationship strength, frequency of contact, rate-of-change of frequency of contact, average time-lapsed prior to reply (speed of reply), and rate-of-change of speed of reply, and may further include a medium: text (email, sms, mms, bbm, or xmpp) or call (audio or video). Examples of proxy values may also include: message character count, including for text-based posts and text from audio transcriptions (audio and video); semantic recognition of dates/times, locations, people, phone numbers mentioned, and tasks mentioned; document type; document participants, including individual or group (user's relationship to document (creator, editor, and/or viewers)); document revision history, including rate of change of page/paragraph/character count; address inputs and geo-location tracking; and browsing history, including by domain and date/time log.

Additionally, information processor 102 advantageously may operate as a "learning system." For example, ranking values are periodically updated as a function of information processor 102 employing one or more algorithms. For example, a parent may consider a child, spouse or business partner as a highest priority, and consider a friend as the second highest priority. Information processor 102 may be programmed and configured to determine such prioritized relationships automatically and initially, or may learn such priorities over time.

In an example, two people collaborate on a particular task or set of tasks intensely for a finite period of time. During that time, information processor 102 recognizes that the strength of the relationship between them increases and is strong. Once the task or set of tasks is complete and contact between them is less frequent, information processor 102 recognizes that the relative strength of their relationship decreases. Therefore, in an embodiment, the frequency of contact is one factor (though preferably not the sole factor) used to determine the strength of a relationship between two or more people. Another factor that may be used in making such determination may include, for example, the amount of elapsed time from when a message (e-mail, voice message, missed call or the like) is received by a user to when the user responds or replies.

In an embodiment, access to legacy data-events that may be stored behind one or more firewalls are restricted to use of one or more desktop software applications that provides VPN or SSO security credentials from the user. This enables a user to use a specific service's localized API or set of API's and access data-events relevant for, for example, the client-side user experience. Moreover, data-events collected on local machines or firewall protected local networks may be sent to hosted servers via one or more desktop applications in order for the data-events to be copied over to a user's Internet (e.g., web) account. The respective desktop application(s) may be installed by the user after being instructed to do so, for example by information processor 102 and/or the web service.

In an embodiment, an ability to import and optimize data-events from legacy services is provided to determine specific user-based tasks, including from the onset of using the one or more features provided in accordance with the teachings herein.

Preferably, user data-events provided from one or more sources are imported and one or more numerical values are provided to at least some of the data-events and/or common sets of data-events for algorithmic ranking. Furthermore, a comparison of sets of data-events may be made to enable information processor 102 to determine optimal moments for one or more tasks to be completed. As used herein, tasks are things that need to be completed by users. Optimization may occur, for example, following an analysis of the number of tasks that a user has yet to complete, or a respective task that has not been completed. Certain end tasks or end goals may be determined by information processor 102, for example, by a mathematical analysis of legacy data-events. In addition or in the alternative, user may construct a set of tasks for information processor 102 to optimize.

Additional functionality in accordance with the present application may be provided for one or more computing devices, functions, interfaces, features, plug-ins, Internet-based devices, and/or peripherals. For example, data-events that are collected or otherwise obtained may be "pushed" for client-side processing substantially in real-time through an internal set of application programming interfaces. Additionally, functionality provided in accordance with the present application may be for optimization. For example, data-events may be numerically sorted, compared, and ranked using a dedicated optimization algorithm running on hosted web servers and pushed for client-side processing substantially in real-time through one or more of an internal set of application programming interfaces.

The present application provides for optimizing tasks across a network of any size, so as to improve the operating efficiency of the network. In organizations, the ability to optimize time allocation by multiple users may be constrained not only by the complexity of finding an optimal solution (which increases exponentially as the number of users increases), but also by the inevitability of constant updates. These updates (e.g. changes or added inputs) often arrive at unpredictable times, for example because many users will generate different tasks (e.g. appointments, etc.) as they occur over the course of a work-day, or as they arrive from quasi-independent sources (e.g. missed phone calls, new e-mails, texts etc). Each newly arrived data-event may require re-initiation of a classic optimization algorithm, such as the one used for individual (i.e. consumer) users.

Constant re-initiations may require re-prioritization to reflect the objective of the network, either individually or as a collective organization. Such dynamic optimization presents a challenge even with current computing resources. The present application answers this problem by creating a coordinated centralization structure with multiple layers of groups, rolling up from an individual level to (possibly overlapping) sub-groups and finally to the grand organization. The novel design creates a pseudo-currency by means of which organizational co-operation (between individuals and sub-groups) earns more credit of such currency for the co-operating member (as does on-time task completion). Thus users can "buy" or "sell" co-operation. Appropriate incentives are provided to steer individual and group tasks toward an organization's priorities and objectives. These incentives include, but are not limited to, allocation and reward of currency (or chits) and a system to evaluate performance. For example, one late task submission can be compensated by the co-operation in another task. Setting sufficient, but not excessive, liquidity, is an important task-action in accordance with the teachings herein. Moreover, managers may be provided the ability to add liquidity at local level, or to reprioritize workers' priorities (for a select period of time) using the currency allocation at his/her disposal. The present application provides direct measurement of individual productivity. Management is provided with a useful tool (for example, if assigned tasks consistently take longer than management estimates, then it may mean that insufficient time for completion is being allocated by the manager in question). Managers are able to view only work-related tasks of individual users, so privacy is maintained.

As a consequence, workers have time allocation optimized for themselves, subject to organizational needs as well as each individual's own prioritization of personal tasks. The algorithms may, for example, set up meetings based on availability of some invitees, automatic rescheduling of others, and requests for co-operation to the rest. If some employees are crucial for a meeting, then times when they are available are selected. For example, each individual's decision to "spend" his/her currency is used for setting up a meeting. The amount of currency allocated to a task (in this case, a meeting) reflects an individual's prioritization of this task in optimizing his/her own performance metrics. This de-centralized coordination views an individual's (or an agent) currency spent as a surrogate for his/her prioritization without having to know how an individual comes to that decision, thus bypassing the complexity of the optimization of a very complex system with many interacting components and constraints. The present application also protects privacy of an individual, for example, by not having to know an individual's decision process, but only how much a person is committed to spend.

The present application addresses this problem by deriving individual or local (e.g., a very small group) optimization. In addition or in the alternative, a sort of pseudo-currency is provided wherein a form of credit is earned for network communications. Organizational co-operation, for example, earns more credit of such currency for the co-operating member (as does on-time task completion). Thus users can "buy" or "sell" co-operation. Setting sufficient, but not excessive, liquidity, preferably managed by information processor 102. Managers have the ability to add liquidity at a local level, and/or to reprioritize workers' priorities. Information processor 102 may provide a direct measurement of individual productivity. Management may be provided with a useful tool (for example, if assigned tasks consistently take longer than management estimates, then it may mean that insufficient time for completion is being allocated by the manager in question). Managers will be able to view only work-related tasks of individual users, so privacy is maintained. As a consequence, workers will have time allocation optimized for themselves, subject to organizational needs. The algorithms will be able, for example, to set up meetings based on availability of some invitees, automatic rescheduling of others, and requests for co-operation to the rest. If some employees are crucial for a meeting, then times that they are available will be selected.

The currency approach in accordance with the present application is novel in at least two respects. Its formulation resolves very large optimization problem with many actors/participants and their individual preferences as well as value trade-offs. Moreover, it coordinates actions of an organization's many participants belonging to different hierarchical levels, and it decentralizes a large organizational optimization problem into manageable components. The formulation allows various degrees of autonomy at different level of an organization while maintaining its basic hierarchy. The top level of an organization establishes the reward structure, which propagates down the org-chart. The controlling element is the allocation of currency from top to bottom, with the lowest level being an individual. In an embodiment, each participant allocates his/her currency to "bid" for convenience while optimizing his/her own performance. If a person should value his own personal task at a particular point in time by using up a large allocation of his currency, a schedule reflecting such priority may be provided while taking into account the inputs from all participants. "Putting your money where your mouth is" provides the needed signal for an organization to prioritize tasks while maintaining privacy of an individual. The central coordinator (or scheduler) does not need to know the details of an individual's constraints since preferences are captured in an individual's allocation of his/her currency consumption. A more advanced approach may allow the borrowing/lending of currency amongst participants to reflect the urgency of time at any particular moment. Another feature provided herein is the reward/award of currency to reflect management control (analogous to the award of monetary bonuses) over its employees.

Use of a currency system to coordinate an organization is an iterative and dynamic enterprise that regularly evolves. Tasks are completed and/or modified and new tasks are generated. The appropriate level of re-optimization over time is a balance to achieve better optimization and the feasibility of (timely) real-time feedback and decision making. The present application accurately reflects an organization's priority while providing employees control and privacy over their own lives.

Figure 3:
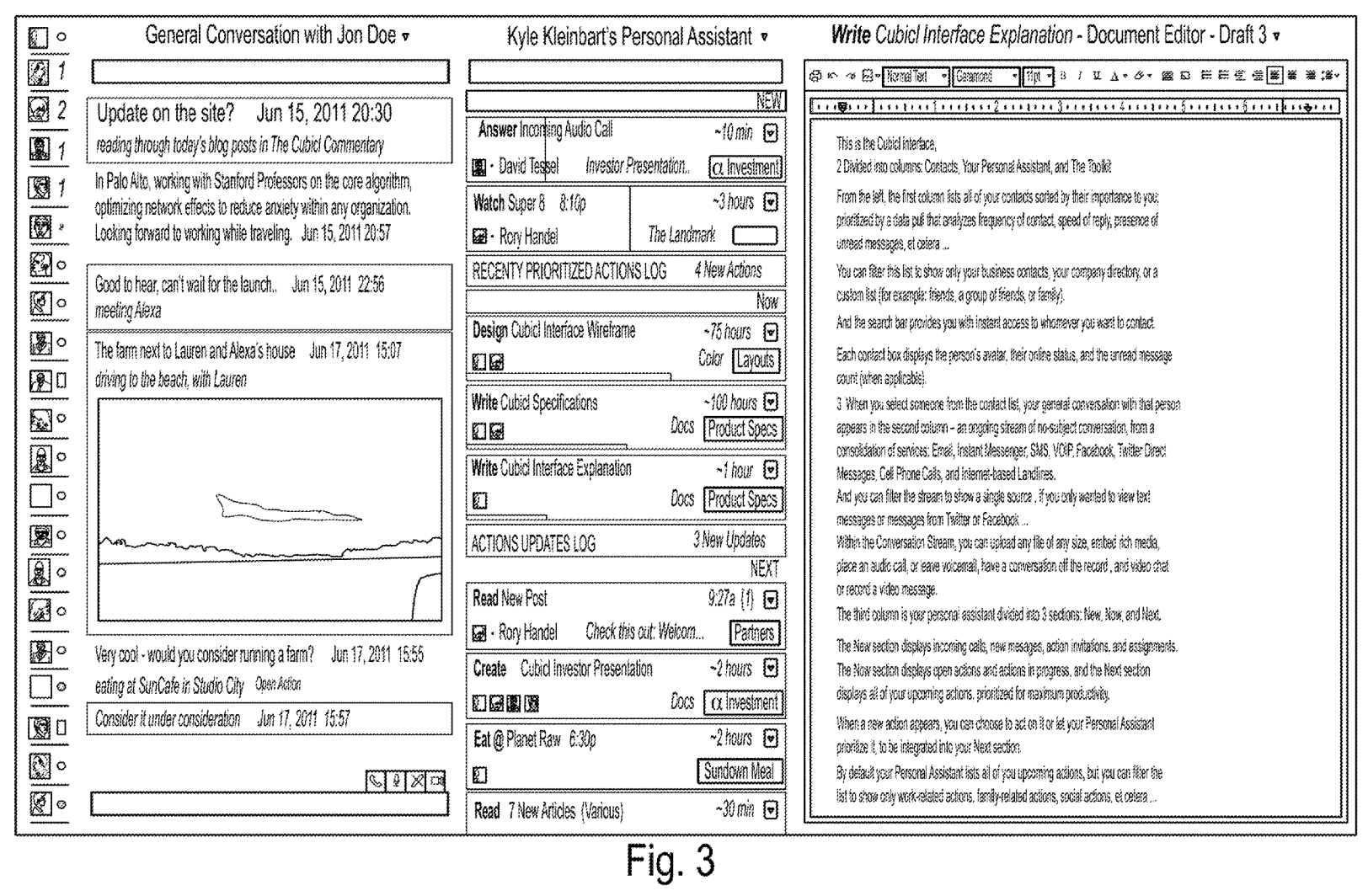
Figure 4:
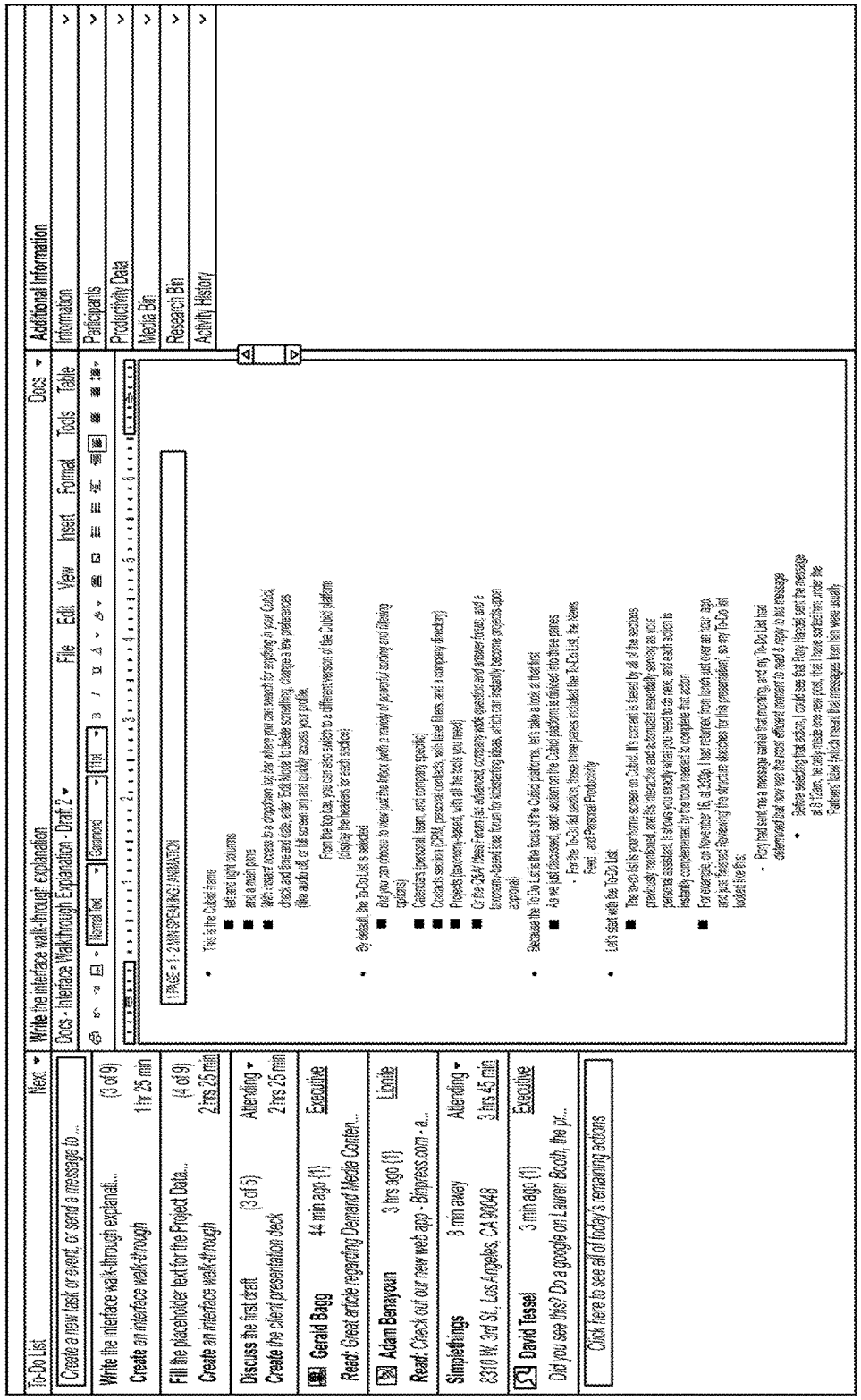
FIG. 4 illustrates another example display that includes features provided in accordance with an example embodiment.

In an embodiment, a "to-do" list is provided that includes the most pressing tasks (e.g., the seven most pressing tasks that must be completed). A selectable option may be provided if a user wishes to view an expanded list. The optimization algorithm orders the list. Tasks that are completed are removed from the to-do list, and may be accessible within a dedicated completed tasks section. When tasks are created, the optimization algorithm adds them to the list. Users can add tasks to the list, or they may be added indirectly. For example, in case of a missed call, a task may be generated to return the call. Unanswered e-mails are also tasks (e-mails that are opened and dismissed may be excluded). Both of these are prioritized in part by the relationship strength. Relationship strength is derived by examination of the user's history with the caller or sender of the e-mail, or by designation by the user of relationship strength. Prioritization is also determined by reference to the user calendar. If a user uses more time for a task than originally allocated, then some shorter tasks may be reallocated before the next, but closer hard deadline task. As an example, if a user with a lunch appointment task at noon finishes a task at 11:30, and cannot accomplish a task of 45 minutes duration before lunch, then the alternative of starting the 45 minute task, or placing and completing 3 calls on the task list may be provided that, based on past experience with the call recipients can be completed in the available time. Similarly, tasks may be reallocated if the user completes his/her tasks more quickly than anticipated. As experience grows, estimates of time will be refined to enable completion of particular kinds of tasks. All of this is preferably reflected in the to-do list. A user can also complete tasks out of the suggested order. Although sub-optimal in terms of time allocation, task completion is kept in consideration. This component of the optimization system is local in nature, optimizing in a small scale (both in terms of time and scope). For example, see FIGS. 3 and 4.

Moreover, a list may be ordered, for example, via an optimization algorithm. As tasks are completed by users, those tasks are immediately removed from the users' respective to-do lists. As users create tasks, for example, via a task-management software application, the tasks are added to the users' respective to-do lists, for example, via an optimization algorithm. In an embodiment, users may add tasks directly to a to-do list, or tasks may be added to a to-do list via information processor 102. In either case, the tasks are prioritized, at least in part, via a respective relationship strength, which may be derived by examination of a user's history with another person (e.g., a caller, or sender of an e-mail) or otherwise as designated by a respective user. Prioritization may also be determined by reference to a user's calendar.

Tasks may be allocated and reallocated according to one or more conditions. For example, if a user uses more time per task then originally allocated, tasks that may require a shorter amount of time may be reallocated before a next deadline. For example, a user with a lunch appointment task at noon finishes a task at 11:30 a.m., but cannot accomplish a task requiring forty-five minutes prior to the lunch appointment. Information processor 102 may offer the user an alternative of starting the forty-five-minute task at a different time, or may place or complete three calls on a to-do list that, based on previous experience with the callers, may be completed in the available thirty-minute time period. Similarly, an information processor 102 may re-allocate tasks in case a user completes his or her tasks more quickly than originally anticipated. Information processor 102 uses data-events received in connection with the task-management to "learn" and refine estimates of time that may be required to complete a particular task or kind of task. Also in an embodiment, a user may perform tasks in an order other than that proposed by information processor 102. This may be sub-optimal, in terms of time allocation, however, information processor 102 preferably acknowledges when tasks are completed and adjusts to-do lists accordingly.

Also in an embodiment, a to-do list is generated in accordance with an optimization algorithm that is provided with one or more constraints. For example, calendar tasks (e.g., birthdays, meetings, doctors appointments or the like) and tasks that may not be calendar-related, such as user-generated tasks (task-generations) added to a to-do list, missed telephone calls, unanswered e-mails or the like. This to-do list may either require the allocation of available currency by the user or a suggested allocation amount (subject to all other competing tasks under this user) may be suggested, based on learning. The learning algorithm takes into account a user's prior behavior as well as performance feedback from the global system.

In accordance with an embodiment, multiple or various APIs for conjunctive access/use and coordination of optimized tasks are integrated in a to-list. For example, information that may be available from the service via an API is used by information processor 102 in developing and/or maintaining a to-do list. For example, information processor may recognize when a user picks up an iPad or a cell phone from his or her desk. Other examples may include how long it takes for a user to get to his or her car, or how long an elevator may take to get from one floor to another at different times of the day. Information processor 102 may know a location of a restaurant at which a particular lunch appointment has been made and select a route with information derived, for example, from GOOGLE MAPS via an API, and estimate the time it may take to travel that distance via GOOGLE TRAFFIC, also via an API. Information processor 102 may also display a warning to the user, at a particular time (e.g., five minutes prior to an estimated departure time, and may provide a more urgent alert at the scheduled departure time). When the user leaves his or her desk, for example, information processor 102 recognizes that he/she is in motion, such as via GPS signals from the user's cell phone, and controls or otherwise provides information via display screens on the user's iPad, smartphone or other mobile device until information processor 102 recognizes the user has returned to his or her desk. Information processor 102 preferably takes advantage from a plurality of data-event sources via APIs, which provides significant opportunity to use information in real-time or substantially real-time for accomplishing tasks and allocating time optimally and/or efficiently. Thus, a conjunctive use and access and coordination of tasks is provided by integrating multiple/various APIs and one or more data-event sources. In an embodiment, a to-do list is provided that includes information integrated via multiple and/or various APIs for coordinating data-events and for optimizing tasks. Moreover, and as noted herein, information processor 102 preferably "learns" via past activity and improves ongoing optimization as a function thereof. Available information (e.g., GPS, traffic, pending tasks, time constraints, personal preferences, or the like) may be provided, for example, by modern technologies.

In an embodiment, one or more task-based tool-kits are provided that are expandable and/or customizable. As used herein, a tool-kit refers, generally, to a collection of programs that allow for task-actions and content production. For example, tool-kits may be provided for dedicated communication streams and/or logs, video conferencing portals, document editors (e.g., Word documents, spreadsheets, presentation software, 2D/3D image editors), map and location based software, internet web browsing applications and/or data-event monitoring. In an embodiment, information processor 102 and/or user workstation 104 displays an on-screen work space for executing one or more tasks by a computing device. For example, a user who needs to prepare a document or a spreadsheet uses a workspace in accordance with the teachings herein that includes standard office productivity software application(s). In an embodiment, the majority of the display screen is occupied by the office software, with a margin or column located, such as on the left hand side, to be dedicated to a to-do list. In an embodiment, another margin/column may be provided that is adjacent to the to-do list or may be provided in some other area which may be used, for example, to display a contacts list, open conversations in a chat-related environment or other useful application. Information may be shared in one or more workspaces with other users for collaboration. Examples may include collaborating on a document, spreadsheet, CAD/CAM or other applications. A user who is registered with information processor 102 may invite another registered user to collaborate on one or more tasks, or a user may invite a non-registered user to collaborate, such as via a web browser software application over the internet. Other functionality that may be provided includes video-conferencing, financial market information or any other accessible data-event sources via one or more APIs, for example.

In addition to a to-do list that may be generated and/or managed in accordance with the present application, a contacts list may also be provided in one or more embodiments. For example, a list of all of the users' contacts may be provided in order of relative importance at any given time, such as via a prioritization mechanism that is implemented in substantially real-time. The prioritization mechanism may account for a set of variables, which may combine to form a quantified relative progressive strength of one or more relationships in accordance with each respective contact in a contact list. This may include, for example, based upon a number of unread messages, a total of unread messages by the number of words, the average speed of reply to one or more messages, the rate of change of speed of reply to one or more messages, the quantity of contact made with a particular contact, a rate of change of quantity of contact made with one or more contacts, the duration or quantity of uploaded media sent to or received by a respective contact, a quantity of collaborative activities in connection with one or more contacts, and a user designated value representing a particular relationship strength in connection with one or more contacts.

In an embodiment, each contact associated with each user is assigned a relationship strength which is represented in an icon which may be formatted as a bar having a length that indicates the respective strength value associated with the relationship between the user and a particular contact. When a user selects a contact from his or her list, for example, the bars are displayed to indicate the relative importance. Also in an embodiment, a conversation stream is provided which represents a history of conversation both past and present that is displayed, for example, in a column that is provided adjacent to a list of contacts for a user. In this way, as the user selects a contact in a contact list, the conversation stream between the user and that selected contact automatically appears and is displayed to the user. In addition to managing information associated with contacts and tasks, one or more portals may be provided that is preferably web-based and usable for introduction, importing, and converting user-based data-event information. When a user shares information via the present application with a non-registered user, for example, for collaborative purposes, the non-registered user receives an invitation to register with information processor 102 and become a registered user. A non-registered user preferably receives an on-screen invitation each time that user collaborates with a registered user. As used herein, users may be "enterprise" users or "consumer" users. Enterprise users are identified, for example, via an e-mail address that includes a company name in the domain, and/or uses a domain suffix such as .com, .org, .co or the like. Non-registered users who operate from an enterprise e-mail address of that sort, may also receive an enterprise invitation, which may be forwarded to management personnel within the respective enterprise organization.

In addition, a taxonomy is preferably generated by one or more processes associated with information processor 102. For example, tasks associated with an organization and/or individual may be mapped across a timeline and a graph representing a hierarchical association of the tasks and may be provided to denote a correlation of tasks and individual, group and/or team involvement with tasks over time (i.e., the past, present and future). Participants within an organization who may be associated with a respective task and in some cases individuals who are not, are assigned respective roles that are associated with a respective task. For example, individuals may be assigned roles such as primary administrator, administrator, editor, viewer and/or an owner of a task. Tasks and role assignments associated with users within an organization may determine the degree or how much of an organization's task taxonomy may be accessible and/or viewable to the user. For example, a chief executive officer ("CEO") may be assigned a role as a primary administrator for a task that he or she is leading directly. Other tasks that may not be directly led by that CEO may be defined as an administrator or an owner. In such case, the respective CEO is able to view and have access to all tasks within a respective task taxonomy. In another example, a department head, such as a director or a manager, may be assigned as a primary administrator for tasks that he or she is directly leading, may be set as an administrator for certain departmental tasks or for some tasks that are outside his or her department, but may be assigned a role as a viewer for tasks that are outside of his or her department and an owner for tasks that are inside his or her department. In that case, the department head may be able to view and access some tasks that are outside his or her department, but may be able to view and have access to all tasks that are inside his or department in accordance with the task taxonomy. The task taxonomy in accordance with the present application may also provide visual cues for identifying activity, referred to herein generally as "task traffic" within an organization. This may include displaying respective progress of tasks within an organization including the capability to determine areas of flow and stoppage and where persons and/or resources may need to be added and/or removed in respective tasks. Thus, a system to display monitoring of global progress within an organization is provided.

In addition to task taxonomy, a form of a personnel taxonomy for organizations or individuals may also be provided in accordance with the present application. This may include providing information that allows a viewer to filter and/or orient a taxonomy structure to display a graph representing participants which may be weighted by the sum of variables representing, for example, by the sum of task responsibility and prescribed task roles. For example, the CEO in the previous example may be represented at a top of a personnel taxonomy and identifying the greatest total responsibility as the owner of all tasks serving as a primary contributing data-event point. As described herein, data-events may be obtained from various sources via one or more APIs, for example, for travel-based information (e.g., mapping technology, airline tracking, travel reservations and tracking or the like) in order to allow for coordinated tracking of travel across a respective geography and over a period of time. In addition to travel and geography-based tracking, billing and cost analysis may be provided, for example, to coordinate tracking of travel and related expenses across a geographic and time-based taxonomy.

In an embodiment, support for quality assurance is included for users to submit and receive questions and answers associated with one or more tasks. In an embodiment, topics that are frequently discussed may be identified and collected through an analysis of semantics and presented to one or more users in a ranked format such as from highest priority to lowest priority. This ranking may be compared to tasks that are commonly taken and to provide a further optimized support center. For example, on the administrative side, user accounts may be taken over, for example, via screen sharing with permission from a user in order to receive personal guidance.

In addition, a downloadable desktop-based live-folder may be provided for task-oriented organization. This may include change tracking or the like. In this embodiment, users may be able to download a private desktop-based folder that operates with his or her to-do list substantially in real-time. The desktop-based folder may require a form of installation and thereafter authentication (e.g., username and password) for access and the folder may be organized such that each task coordinates with a respective folder for accessing and uploading files and/or media associated with respective tasks. In an embodiment, opening a folder may identify a folder of each of the user's containers, which may include an all-encompassing collection of tasks (e.g., personal, organizational, or the like). In an embodiment, a container folder holds a folder for each cabinet, which may be a clustering of tasks for organization purposes, and each cabinet may include a folder for each to-do list section (e.g., past, new, now, next, intent and objective). Moreover, each to-do list section that includes a folder for each task or task group, with each task group potentially containing a folder for each task, and each task folder containing files and/or media associated with that respective task. Preferably, only task and task group folders provide an ability to read and/or write content, and changes and updates made to content within a folder are recorded in the application and logged in connection with the task-action history log(as mentioned herein) for any edits made to tasks as edited in real-time.

In an embodiment, a plurality of heuristic-based task templates are provided for organizations and/or individuals and associated with one or more databases. In this context, a task and/or task-group may include a template representing an order of operations for achieving an objective and that is cataloged in a heuristic database. For example, the database may include a collection of user-generated tasks and/or task-groups. The data may be compared and contrasted with similar tasks and their effectiveness (measuring, for example, the time-spent, steps taken, and/or quantity of content produced), which may eventually provide a task catalogue of task templates. In an embodiment, task templates may be organization-specific or available for all users. Alternatively, task templates may offer additional or alternate options. Preferably, task templates are alterable for customization purposes.

Figure 6:
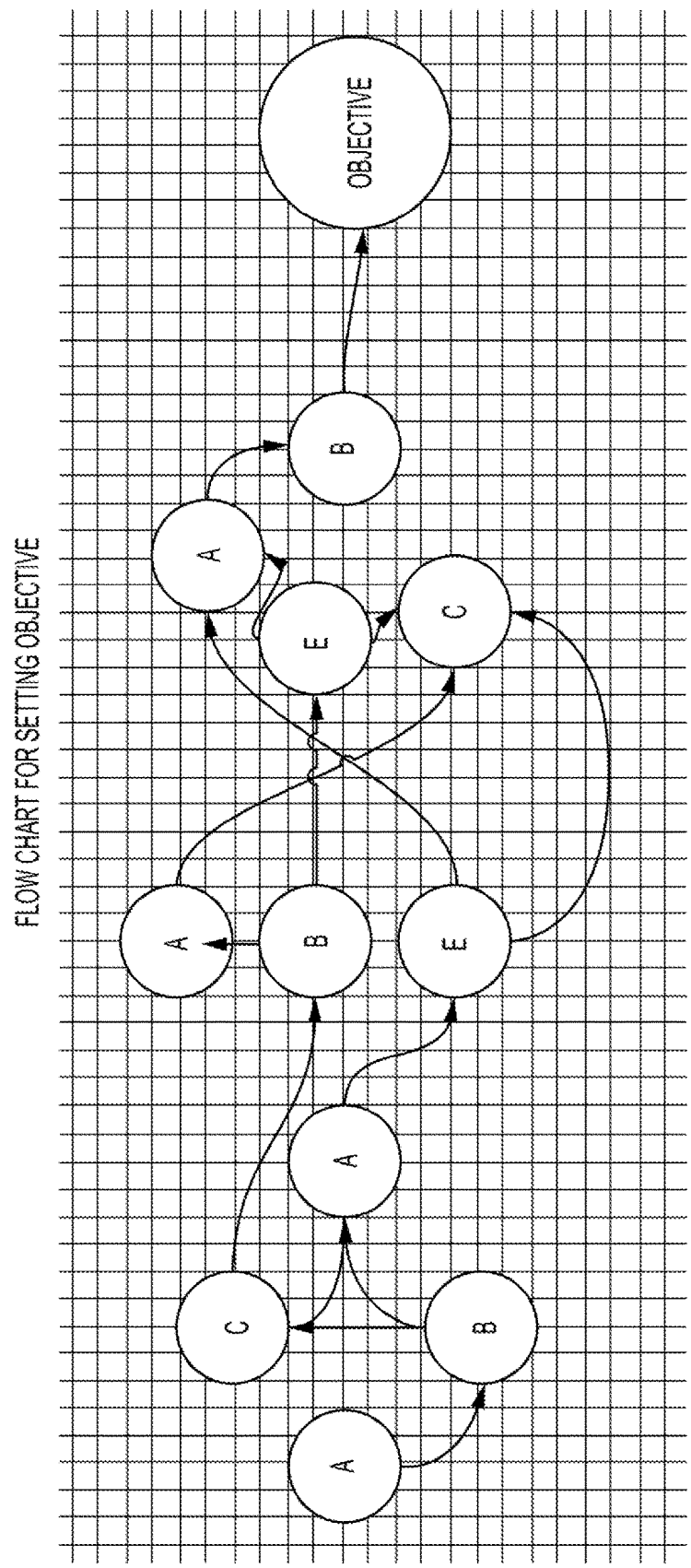
FIG. 6 is a block diagram illustrating a "ripple effect," in accordance with an embodiment.

For example, see FIG. 6. Time is a factor for determining priority. When task due dates are set, an interval of time in between task due dates and the relation to the end goal may be factored. FIG. 6 includes lines that connect circles, and the lines represent tasks. The circles and their respective labels represent people associated with the user and the tasks that are to be completed.

In accordance with the shown in FIG. 6, organization-based tasks may be set manually by an administrator to be optimized, or data may be obtained from services to create tasks. Optimization of time occurs by determining how many tasks are not completed. This hold-up is referred to herein, generally as a "ripple effect," which may result in a chain reaction (across a series of tasks) that occurs when a particular task-action is not taken, resulting in delay of other tasks. The graphical lines illustrated in FIG. 6 are of different lengths, and are not linear. Lines having a longer length may indicate a greater degree of weight and possibly the ripple effect. A specific exponent of time may be evaluated for an optimization of a task. If two tasks are determined to be of equal priority, such that they may take the same amount of time to complete, may hold-up the same amount of following tasks, and may have end goals of equal value, the optimization method may then evaluate relationship strength or other task value determination factors to determine what task need be completed first to relieve the bottleneck and prevent a ripple effect. Series of tasks may be determined from recurring data-events from legacy services that may be received through communication and/or semantic analysis of keywords that promote task-generation.

The present application provides for quality assurance via a semantic-based content-crawling system that collects relevant information, data and/or research. Within a user's account, for example, common keywords in task-actions produced by the user are semantically recognized and cross-compared with content and/or data-events from other, potentially more reliable, web data-event sources that offer an API for access thereto. In an embodiment, a dedicated real-time push capability from one or more preset databases/archives is included to deliver relevant information to the user on demand.

In an embodiment, personal task-based data-events are monitored, and users may view a visual reference, which changes substantially in real-time, of their own task proficiency data. Task Proficiency Data may include a collection of personal data-events that may be presented to the user in the form of the graphs and other graphical representations for a variety of productivity and efficiency parameters (for example, quantity of tasks completed this week, rate of change for quantity of tasks completed over the course of a specified month or set of months, etc.) that provide a detailed overview of individual and collaborative proficiency. For example, a set of visuals display numerical data that are collected and represent a user in areas of productivity, the optimization of the user's tasks over time, and different comparisons and analyses may be provided to the user for self-analysis and encouraged improvement in the proficient completion of tasks.

Moreover, a personal data-event system may integrate multiple/various API's for data coordination. Monitoring personal task-based data-events allows for additional API integration to satisfy more elaborate and/or specialized tracking, such as a productivity-based geographical timeline for monitoring travel, wherein data-events obtained from various travel-based APIs (e.g., GOOGLE MAPS, and various airline and reservation tracking sources) allow for coordinated tracking, such as travel, across a geographical and time-based productivity map/chart.

Tracking and comparisons of tasks versus time and financial data are further provided and may integrate multiple/various APIs for data-event coordination. For example, tasks with associated expenditures (planned or past) may be tied to a 'cabinet' (i.e. label) in the form of a financials meta-tag, for quick reference and organization, and financial data-events that are recorded/tracked and utilized through the integration of financial APIs (such as banking services, checkout services, financial planning services, tax services, financial record-keeping services, other financial services, RFID technology, or the like) with the integration of one or more other business software API's, such as QUICK-BOOKS, which provide, for example, for financial tracking, which can then integrate with a tax software API, for example, to coordinate tax planning and preparation.

Various functionality provided in accordance with the present application is now further described.

In an embodiment, a continuous optimization of tasks is provided over time, including within an open or closed network. Continuous or repeated background iterations are performed associated with optimization. As tasks on a to-do list are completed, deferred, completed in part, or ignored, or as new tasks are added, and/or as deadlines for some tasks draw nearer, or new calendar items define tasks fixed in time, the present application re-allocates tasks and re-draws the to-do list to optimize available time. For individual users, for example, optimization is performed for user-related tasks, while enterprise-related optimization is performed for enterprise users. Further, the present application supports scheduling tasks for internet/web-based media. Rich media and text-content may be separated from accessory items on webpages (e.g., menu-bars, advertisements, share buttons, or the like) and users may schedule a task for such an item (e.g., read a piece of writing, or watch a video.) by selecting a 'new task' button, such as provided via browser-based extensions, and by choosing a date/time by when the user would like to complete the task. The task is preferably then integrated into the 'next' section of the user's to-do list.

The present application further supports assigning a respective intent for task-actions with an internet/web-based item. Substantially as described herein, users may schedule tasks for internet/web-based items. If the user schedules a task for an item, without specifying a date/time for completion, the task may be added to a graphical panel provided with the to-do list for tasks that are created without a specified start/end date. Further, the present application supports collecting internet/web-based media for task-oriented organization. In this embodiment, rich media and text-content may be separated from accessory items on webpages (e.g., menu-bars, advertisements, and/or share buttons), and users may save rich media and text-content to specific tasks in their respective to-do lists by selecting a 'collect' button, which drops down to reveal a new-task/search-bar. The search bar may enable the user to search for and locate existing tasks or create new ones, and task sections (e.g., past, new, now, next, intended) and cabinets (e.g., meta-tag labels) are provided that reveal the tasks within them. Selecting a task from a task section or a cabinet allows the user to then select one or more pieces of rich media and/or text-content to save to the specified task, wherein the saved media/text appears in a media section for the specified task.

Moreover, a consolidation and/or integration of suitable communication protocols (such as email, xmpp, sms, VoIP, video calls—web/internet or cellular communication protocols) is provided in accordance with the present application. In an embodiment, paid or public access to a communication service's APIs or specific protocols for obtaining data-events, such as short codes, chronologically order all conversations between two users over time using a combination of data-events from widely used (including web-based) communication protocols and cellular protocols. Once a user grants the web server access to their accounts for the aforementioned protocols, the conversations may be ordered in real-time on the server side, such as via semantic recognition for dates, contact information, times or the like. The data-events may then be pushed to the client applications, thereby providing a unified messaging system.

In an embodiment, a categorization of conversations as social conversation tied to people (which may be devoid of tasks), or task-related conversation that require follow through and further task-action is provided. Conversations, which may include e-mail exchanges, TWITTER direct messages, voice conversations, audio messages, video conferences, or the like may be categorized as either (a) social (which require no task-action on the part of participants) or (b) task oriented. The latter category will cause identified tasks to be generated and placed into the to-do list. Task-generations may be done automatically, through API application of text-to-semantic interpreter, and integrated into the to-do list, or through audio-to-text-to-semantic interpreter, and integrated into the task list. The audio-to-text may be used for phone conversations, voice mails, the audio component of videoconferences or conversations, or other forms of audio communications.

Moreover, a real-time prioritization of incoming messages is preferably supported, for example, by examining the relationship strength of the user to the sender of the incoming message using legacy data-events collected by the service. From the onset of use, Authorized users may provide data-events. Various data-events are factored, including the sentiment and semantic analysis of conversation, rates of change regarding conversations (e.g., speed of reply, and quantity of content), and the relevancy of the sender in relation to optimal prioritization of the users tasks determined by the optimization algorithm.

Further, the present application may provide prompts for instant task-generation. In an embodiment, text entered, but not necessarily selected, appears in the new-task/search-bar (described herein) and real-time filtering is performed to recognize existing relevant tasks. A user may select an existing task from the search results, create a new task with specified what/who/when/where parameters (tasks without when parameters are placed in the intent list), or instantly create a live task (to commence immediately). Overtime, task topics (e.g., read, write, watch) that may occur frequently but have yet to be universally implemented as Task Presets, may become presets for the specific user. With entry of a recognized task topic, the relevant tools needed to complete the task may be pushed over to the client side user experience substantially in real-time.

The present application supports digital versions of business cards. Referred to herein, generally as "contact cards," users may be responsible for the content of their contact card, or contacts represented by contact cards may be responsible for submitting information therein. After a user and contact have connected (e.g., have established conversation) one or more prompts may be provided to share contact cards or engage in a task, through which sharing contact cards may be automatic. Contact Cards may be provided in a live contacts list, and updated substantially in real-time when a contact changes content on the card.

In an embodiment, a division of tasks into time-frames (e.g., past, new, now, next) is supported. A to-do list may be divided into the various time-frames, such as past, new, now, next, and the intent panel (described herein). The past section may contain tasks that have been completed, the new section may display incoming tasks (in the form of task invitations or text/audio/video messages), the now section may include tasks that are ongoing, in-progress, or recently commenced, the next section lists all remaining tasks, and the intent panel lists any tasks that are without a specified start and/or end date/time.

Moreover, tasks may be organized into individual tasks and task-groups may be supported. Tasks, of any kind, such as read, write, reply, or the like, may exist as individual tasks or task-groups. Individual tasks are standalone, while task-groups consist of a series of tasks that are tied together and can be completed either sequentially, in parallel, or in any order. Tasks may be allocated to individual persons, or may be allocated to groups of people. When a user creates a new task, he/she can invite others (including registered users and non-registered users) via contact selection that may include an ability to select a contact from one's contact list, email, and additional services (e.g., instant messenger clients, FACEBOOK, SMS, or the like). Users within an organization and individuals in some cases, may assign roles for task participants, such as a primary administrator, administrators, editors, viewers, and owners. The primary administrator, which may be only one person having such a role, is typically the person who creates the task and is granted the privileges of all the other roles and has sole control over the task's settings. Administrators, in contrast, invite and/or assign participants to a task and have the ability to read/write and converse. Editors may read and/or write and converse, and viewers may read and converse. Owners may be assigned administrative-type privileges, but are typically less involved in the details of a task, and may be granted ownership rights more for taxonomic purposes (such as described above with regard to system-generated task taxonomy).

When a user receives an invitation to a task, he/she may decline or accept the task for integration into his/her to-do list. When a user is assigned a task role, the incoming task may appear momentarily in the 'new' section of the user's to-do list (wherein the user can review the assignment, or the like), which is then integrated into the 'next' section his/her to-do list for completing the task at a different, perhaps more optimal time.

In an embodiment, one or more extendable plug-ins are provided for task options. Tasks may be displayed in formatted boxes, referred to generally herein as "task boxes," and displayed in a user's to-do list. The task box may include a directive for a task, such as read 'x', write 'y', reply to 'z', or the like, and may include settings and/or values for various types of information, such as an expected duration or start and end times and dates, a list of participants, a location, the cabinet(s) (where tasks may be clustered into one or more labels for organizational purposes), as well as any task options (e.g., add participants, reschedule, push back, or the like), which may be extended by plug-ins to offer more options.

As noted herein and in accordance with an embodiment, tasks that are created without a start and/or end date/time are temporarily contained in an intent panel, which may be formatted as a dedicated list of tasks that are intended for to-do list integration at some point in the future (either short term, long term, or undefined). Tasks in the intent panel that have a specified expected duration may be integrated into a to-do list at any time with just a single click. Such one-click integration offers a choice of time placement when the user moves the mouse over the button for integration. For example, options may be displayed for 'now', 'today, soon', 'later today', or 'tomorrow' as the user moves a selection device (e.g., the mouse) over a button for integration. When the user selects the 'now' option, the task may be integrated into the now section of the to-do list as a recently commenced, now in-progress task. When the user selects the 'today, soon', 'later today', or 'tomorrow' option, for example, the task may be integrated into the next section of the to-do list, to appear in the now section of the to-do list sooner or later today, or tomorrow. If the tasks of the day are pressing, and an available timeframe cannot be found, a display may be provided, referred generally herein as a "coordinator," which may be formatted as a collaborative planning and conflict resolution window for editing constraints/overlaps, and that helps resolve the issue and reschedule the conflicts accordingly.

Moreover, tasks to be assigned to and performed by people within an organization that are created without a start and/or end date/time are temporarily contained in the objective panel, which may be formatted as a dedicated list of tasks that are intended for to-do list integration at some point (either short term, long term, or undefined), but do not have an assigned start and/or end date/time specification. In an embodiment, an "objective panel" is pertinent to organizations, while an "intent panel" is pertinent to individuals. Tasks in the objective panel with a specified expected duration may be integrated into a to-do list at any time with just a single click. Such one-click integration offers a choice of time placement when the user moves the mouse over the button for integration. For example, options for 'now', 'today, soon', 'later today', or 'tomorrow' as the user moves a selection device (e.g., the mouse) over a button for integration. When the user selects the 'now' option, the task may be integrated into the now section of the to-do list as a recently commenced, now in-progress task. In an embodiment, when the user selects an option for 'today, soon', 'later today', or 'tomorrow, the task is integrated into the next section of the to-do list, to appear in the now section of the to-do list sooner or later today, or tomorrow. In case the tasks of the day are pressing, and an available time-frame cannot be found, a collaborative planning and conflict resolution display window for editing constraints/overlaps when present may appear to help resolve the issue and reschedule the conflicts accordingly. As used herein such display window may be referred herein, generally, as a "coordinator."

The present application further supports optimization of location-based tasks. In an embodiment, such optimizations may be provided by means of integration of GPS signals, or other suitable services, such as GOOGLE MAPS. In an embodiment, access to web-based real-time traffic and location service data-events through an application programming interface supports a determination of the relevancy of a user's respective location in contrast to a future time interval that may be dependent on location-based conditions, such as access to roadways, methods of transportation, and the status of traffic. Furthermore, access to web-based GPS provided directions and traffic flow may allow for optimizing the scheduling of location-based tasks between multiple users substantially in real-time by comparing individual task schedules with location-based time data-events in order to determine and recommend to the user the optimal moment for task-action for a particular task.

Moreover, and substantially as described above, tracking and comparisons of tasks versus time and financial data-events are further provided and may integrate multiple/various APIs for data-event coordination. Tasks with associated expenditures (planned or past) may be tied to a graphical representation of a financials cabinet, which may be a form of a labeling system of clustering tasks for organizational purposes, including tasks related to financials, for quick reference and organization, and financial data-events may be recorded in a spreadsheet action (e.g., track financial expenditures) dedicated to financial tracking. Further, financial data-events may be utilized by integrating financial APIs (such as provided by banking services, checkout services, financial planning services, tax services, financial record-keeping services, other financial services or the like, as well as RFID technology and other remote technology), with the integration of a financial software application API, such as QUICKBOOKS, and financial data-events gathered through tasks may be automatically collected and stored, which may be further integrated with one or more other software applications, such as tax planning and form preparation software (e.g., TURBOTAX) via one or more API's, for example, for further data-event coordination.

In addition to optimizing users' tasks substantially automatically over time, the present application supports introducing a new user to the task-oriented formats and interfaces, described herein, including for providing a to-do list. A new user may be prompted to select and complete preset tasks, such as read 'x', watch 'y', complete 'z', that serve to introduce the new user to features, or new features to users of the present application. As a result, as the user is introduced to the teachings herein an optimized to-do list may be developed.

As noted herein, the present application supports a comparison of semantic-based depth and/or strength of sentiment versus depth/length of communication and over time. Preferably, access to external semantic and sentiment recognition services through an API allows for examination of the respective emotion and content of a conversation over time through constant real-time access of the service. In an embodiment, emotion is designated a numerical value and is compared to a static chart that allows the numerical value to be given a sentimental label. Semantic recognition allows for a determination of measurable values, such as conversation length and quantity of relevant topics. Comparing semantics and emotion over time aids in determining a user's expected response time to an unread or legacy message.

A discussion regarding a graphical user interface in accordance with an embodiment is now provided.

In an embodiment, a live task-timeline user interface is provided that includes at least one graphical line that extends across the page horizontally. The line provides an ability to scroll horizontally to the left or right, and zoom-in or zoom-out, using a custom horizontal scroll-bar with zoom-in/out navigation. Further, along the bottom-edge of the graphical line is a timeline by which linear time may be measured. When this view is engaged, the current time may be displayed, such as in the center of the screen, with the past represented on the left and the future to the right. Along the top-edge of the graphical line may be a task-timeline that displays the duration of tasks (completed, in-progress, recently commenced, planned/next) in coordination with the linear timeline, with start and end dates marked along the graphical line and connected to represent the duration, or life-span, of the task. The user may scroll to the right to view next (upcoming/planned) tasks and to the left to view past tasks (completed). Intended tasks (planned, without scheduled start and/or end date/time) and suspended tasks (tasks commenced, but paused) may appear outlined above the timeline and may be selected, dragged, and dropped into a space on the task-timeline for integration at the specified point—if there is a conflict with the area selected, the coordinator (as noted herein, a collaborative planning and conflict resolution window for editing constraints/overlaps) may appear to help resolve the issue and reschedule the conflicts accordingly.

In an embodiment, a task timeline may be provided in alternate view that is a cyclical model for viewing time, such as a twelve month calendar oriented in a circle. Durations of tasks (e.g., tasks that are completed, in-progress, recently commenced, planned/next) may be outlined. In an embodiment, a circular scrolling option is provided with an ability to zoom-in/out, which allows the user to zoom in from a year (many months) to a month, and a month (many days) to a day, and a day (many hours) to an hour, as well as in the reverse (i.e., to zoom-out). Intended tasks (planned, without scheduled start/end date/time) and suspended tasks (tasks commenced, but paused) may appear outlined outside the circular timeline and may be selected, dragged, and dropped into a space on a task-timeline for integration at the specified point. In case there is a conflict with the area selected, the coordinator (as described herein) may appear to help resolve the issue and reschedule the conflicts accordingly.

Moreover, a substantially real-time stream of data that may be formatted as a list-based user interface is provided. For example, a web-based application is provided that is divided into a set/series of columns (vertical boxes) that function as lists (e.g., static/stationary series of items displayed sequentially in a vertical fashion) or streams (e.g., dynamic/moving series of items displayed sequentially in a vertical fashion). See for example, FIGS. 3-5. These provide structure for user-generated content. For example, columns are provided that include a live contacts list, conversation streams (e.g., conversation history, past and present), and the to-do list. The interface layout is preferably provided consistently for a plurality of various devices, including mobile phones, tablets, laptops, and desktop computers. As the list/stream format is maintained, the number of columns visible at any moment may increase or decrease to accommodate a size of a respective display.

In an embodiment, common task topics (e.g., read, write, watch, or the like.) may appear as clickable-icons (for visual reference) along the new-task-bar (of horizontal orientation, with a field for text-entry adjacent a list of tasks icons, which may exist as clickable buttons that trigger preset tasks), so as to ease task creation for the user and optimization. The order of the icons may be prioritized for each user for ease of access by examining the rate of each task topic selection. The interface may further allow for vertical scrolling within columns, and horizontal scrolling between columns, with actionable items (e.g., elements for selection, some of which enable areas for content production, such as a post box, search bar, or the like) that are available throughout. The interface may also allow a user to navigate using arrow keys for vertical navigation within columns, and horizontal navigation in transitioning between selected columns, as well as an ability to 'tab' between actionable items. Further, a user may use arrow keys to select items from dropdown-lists, as well as designated keyboard shortcuts. Selecting an area for content production (e.g., post box, search bar, or the like) permits the entry of text in the selected area, with the ability to submit the text-entered with the use of a designated keyboard shortcut.

Further, areas may be provided for producing and reviewing content. Some areas of production include the new-action/search bar, post box, and various sections of the tool-kit (document editor, discussion post box, group notepad). Review areas may include conversation streams (conversation history, past and present) and the commentary (a news reader for articles, blog-posts, and other feeds). In an embodiment, areas of production may be visually distinct from areas of review, for example, via color coordination (production sections may appear white, while areas of consumption may appear considerably off-white), so the user may easily instantly differentiate use for any given section.

In an embodiment, when a user navigates through the interface, he/she makes selections, such as search inquiries, task-generations, content production and review (i.e. task-actions), or the like. Such task-action activity (selections, processes, content production, or the like.) is preferably tracked for personal/private reference, and recorded in a history, which may be formatted as a dedicated list for keeping record of user-related activity. The history log may be user-centric (pertaining only to users, individually), and task-actions may be selected from the list to be reviewed and/or deleted (individually or collectively), and users may also submit task-actions or task-generations, such as to the support team or help forum for questions or help.

In an embodiment, a document editor with document timelines is provided, which may include a revision-scrolling-mechanism for history, with user contributions highlighted/crossed-out/dated. Documents may be paired with a document timeline, which may include a vertical scrolling system that allows the user to scroll through all changes made to the document over time. The document timeline preferably works similarly to the "dialog" (as described herein), and is specific to document editing. Drafts are preferably marked along the timeline for quick reference (icons that are automatically placed at points on the document timeline to indicate a new draft. This designates points in time when the document was opened for additional editing, or manually marked to start a new draft, such as by selecting a "New Draft" button). Document timelines may offer two views, which may be selected via radio buttons or another graphical control. One may be a standard editing view where changes are made without identification (additions, changes, and deletions are not marked on the page, and new content simply adds to, replaces, or removes the old content, respectively). The other may be a marked editing view, in which changes are continuously identified through revision marks: additions appear in a different color for each new draft, changes appear highlighted with the replaced content crossed-out and dated with the written date (the date that the now crossed-out writing was originally added), and deletions appear crossed-out. Users may also select between the standard and marked view when scrolling through the history of the document using the document timeline (or through the evolution playback button—see below, document evolution playback).

Moreover, a substantially real-time collaborative document editor with document timelines may be provided. In an embodiment, a revision-scrolling-mechanism for history, with user contributions highlighted, crossed-out and/or dated is provided.

Multi-user collaboration may also be made available through the document editor. Multiple users may edit the same document simultaneously by viewing the document editor for the same task at the same time. A "co-marked" view indicating multi-user editing and document changes are periodically identified through revision marks. For example, changes appear in one or more different colors for each respective user. Underlines and cross-outs may be provided, as well as respective dates and names of the users who make edits.

Furthermore, a clock-like interface may be included that displays measurements of time (integrated with upcoming tasks, and displaying intended tasks for drag and drop integration). For example, a view may be provided for measuring/acknowledging the relationship between a user's tasks and time.

As the amount of time available for tasks on the to-do list is determined to be pushing the limits of time available that will elapse by to-do-list deadlines and limits, visual warnings may be sent to the user, in one of several forms. For example, a message may travel across the screen of the user at fixed (and selectable) intervals, or background colors may change, or font colors on the to-do list may change or flash, thereby providing additional alerts.

A discussion regarding features provided in accordance with the teachings herein is now provided.

When incoming tasks are received, such as task invitations (e.g. incoming calls or messages), they may appear in a 'new' section of the to-do list (such as described above with regard to dividing tasks into time-frames). The user may be provided with a limited amount of time to act (e.g., view, accept, reject, or the like) on any incoming tasks, and a progress bar may be displayed that represents how much time remains before the task is automatically prioritized/integrated into the 'next' section of the to-do list. A user may select a 'recently prioritized tasks log' (available anytime) to view a history of automated task prioritizations, which ensures that the user is continually aware of incoming tasks that have been prioritized.

In an embodiment, when a task participant (an individual tied to a task, or a group/multiple individuals collaborating on a task) adds new content to a task tool-kit (e.g., discussion posts, documents edits, research/information collection, or the like), other participants related to that task are notified of the update(s) via the 'task updates log'. For example, a live (substantially real-time update) history of changes/updates made by other participants within collaborative tasks. The user who has been updated may then select an option to open a task updates log, available anytime, to view a history of changes/updates made by other participants of any/all collaborative tasks (performed by multiple users as part of a group). In this way, the user is aware of updates/changes that are being made to tasks that he/she participates in. The changes/updates recorded in the task updates log may provide details regarding the change/update, and the user may select the change/update to be redirected to the toolkit of that task to view the change/update at the precise location the toolkit. Further, the log is preferably organized chronologically, although users may switch filters to view the log oriented in other ways, such as by prioritized task, wherein the tasks with the highest priority appear at the top of the log.

Moreover, scheduled tasks preferably display a real-time depleting time progress bar in coordination with the time remaining to complete the task. Using time-based data-events received from the client side and a "ripple effect" analysis determined by the server-side task optimization algorithm, task priorities may be further expanded and demarcated, such as by coloring tasks according to their respective priorities. An administrator or manager may set organization-based tasks manually, or may manually override a subordinate's organization-based to-do list, and importing data-events from services may also create Tasks. Optimization of time may occur by determining how many tasks are held up by not completing a task at hand, in the pursuit of an end goal.

This hold-up is called the "Ripple Effect", which is a chain reaction (across a series of tasks) that will occur if task-action is not taken on a task that need be completed for task-action to be taken on a task later in the series (such that what may seem to be a trivial, unimportant task such as answering a text message for example, may be responsible for holding-up a document that follows in the series of tasks). When optimization initially determines that two tasks are of equal priority, such that they may take the same amount of time to complete, may hold-up the same amount of following tasks, and may have end goals of equal value, the optimization method may then evaluate relationship strength or other task value determination factors to determine what task need be completed first to relieve the bottleneck and prevent a ripple effect. Series of tasks may be determined from recurring data-events from legacy services that may be received through communication and/or semantic analysis of keywords that promote task-generation. The client-side user experience may include a real-time shade change of color as a task becomes of higher priority. Overtime, task efficiency data coloring may slightly change, in order to determine the optimal color priority scheme for an individual user.

In an embodiment, unread messages are preferably distinguished from read messages with a visual cue: unread messages may appear 'highlighted' (for example, an emphasized, brightened border, and with slightly marked-up text (bold and/or italicized)). A user may mark unread messages as read, simply by clicking on the text of the message or the highlighted-frame/border, which will remove the highlighting and markup, thus designating the message as read. Users may further have an ability to share ongoing or upcoming tasks to a user or group of users, with the choice to offer opt-in task participation to those whom the user has shared the task with. After the initial user chooses to share a task by clicking a relevant button, he/she may be prompted to choose from a list of prioritized contacts and groups (e.g., user-defined groups of contacts) to achieve a more personal experience. Similarly, the user may share tasks via outgoing messages sent via the protocols connected by the user over time, such as via e-mail, SMS or other suitable protocol.

In an embodiment, the to-do list is preferably divided into time-frames (past, recently ended, new, now, and next) and would require considerable scrolling when browsing through past and future (next) tasks as time progresses. In an embodiment, a 'dialog' interface is provided, which represents a unique scrolling interface, which makes it easy to scroll through short and long-term history (past and future) with a multi-directional scrolling mechanism. As standard, the user may scroll vertically through the list to browse, but the dialog interface may also enable the user to scroll horizontally within a section. When the user begins scrolling horizontally, a miniature timeline may appear horizontally-adjacent to the scroll-bar of the respective section, offering time-frames of years/months/dates for selection, so as to jump to the designated time-frame, at which point the user may continue to scroll vertically through the tasks listed (with date and hour markers listed for reference). The user may continually switch between vertical and horizontal scrolling, browsing through tasks linearly, or may jump to a specific year/date and then continue to browse in a linear fashion. The dialog interface is also present for other sections, such as conversations, documents, activity history or the like.

In an embodiment, real-time automated presence/change-detected time-tracking for tasks is provided. Tasks listed in the now section (ongoing, in-progress, and recently commenced) of the to-do list are time-tracked (time-spent is measured, catalogued, and displayed to the user) by recording how much time the user spends performing task-actions (e.g. viewing or contributing content) within a task's toolkit. A user may also select from a variety of preset task-actions tied to every task (examples may include the ability to push forward (set to complete sooner), push back (set to complete later), adjust the start and/or end date and/or time, adjust the duration length (how long the task is set to last), invite participants (for personal tasks), assign participants (for organization-based tasks), remove participants, mark the task complete, edit the task, delete the task, leave the task (as a participant), and schedule to complete later at an unspecified date or time).

Further, task integration for real time semantic-based reservations, such as for restaurants, flights, or the like is provided. The inclusion of semantic interpretation provides for recognition of a need for a task and to execute the task-actions, if such task-actions are executable by API. For example, if a user in a conversation with another person (e.g., via telephone, text, e-mail or the like) suggests a lunch meeting the following Tuesday, then using first either text-to-semantic-interpretation to task-generation, or audio-to-text-to-semantic-interpretation to task-action via an API, one or more restaurants close to both speakers or close to where the user is expected to be at the time immediately before or after (by reference to the to-do list and calendar) are suggested. Other determining features may include the two speakers' collective preference, as determined by historical reference, or as a result of a questionnaire in which the user may confirm preferences suggested by the application. Restaurant suggestions may be made in accordance with other variables, such as under constraints of estimated travel times and traffic conditions, such as using data-events from GOOGLE TRAFFIC and GOOGLE MAPS. The user may then confirm time and place, and the reservation may be made via API connected directly to the web-site of the selected restaurant or a restaurant reservation provider. Further preferences of users and contacts, such as dietary requirements and other pertinent details, may be tracked. Other travel-related or entertainment related application of this capability is expandable as other data-events are received and analyzed.

In an embodiment, numbered/bullet/hierarchical lists are available in document editors and other programs, which provide a method of organization for written content. Items may be selected to collapse (hide from view, and selected again to reveal the sub-items. Moreover, through the integration of an audio transcription API and semantic interpreter API, audio/video calls/messages may be interpreted to present the user with a transcript of the audio/video call and task-generations interpreted from the transcription text or text-based message. Further, semantically interpreted task-generations from audio/video calls/messages are provided, such as for confirmation-based and instant integration.

In addition to username and password authorization, the present application supports a facial-recognition API (e.g., Face) to enable logged-in users to register their faces for identification purposes. Users' facial identities may be incorporated into a login page, in which a user may opt-in to have his/her face recognized so as to display his/her username and requiring only a password to login. Occasional security confirmation efforts (e.g., presenting security questions to be answered) may further be made for identity verification purposes.

Moreover, semantic and keyword-recognition via third party services may be integrated via an API for filtering existing or new content in comparison to user relevance, substantially in real-time, in order to display existing data-events relevant to the user in the quickest manner possible. This aids the creation of new content or task-generations due to the speed at which the user can determine the pertinence of their keyword inquiry.

The present application further provides an ability to quick-reply, preferably without opening/viewing the conversation/discussion. For example, the live contacts list (as described herein above) offers an ability to quickly reply to unread messages. In an embodiment, the live contacts list displays contacts' avatars, online status (e.g., online, idle, offline), and unread message count (if any) by default, although the user may move his/her mouse over a contact to view more information. For example, information regarding task status (latest published task(s)), unread message preview, relationship strength bar (a visual representation of contact prioritization), or the like may be displayed to the user. Also in an embodiment, if a user moves his/her mouse over a contact, and then moves his/her mouse over an unread message preview, he/she can click a 'Quick Reply' button that allows the user to view the unread message in a small pop-up window, compose a reply in the post box of the same pop-up window, and send the message by clicking the 'send' button within the pop-up window.

The present application further provides an ability to forward person-based conversation messages (audio/video/text) to task-based discussions. Along with an ability to forward a person-to-person-based message to another contact through a forwarding button that appears adjacent each message when the user moves his/her mouse over a message, wherein person-to-person-based messages may be forwarded to a task or multiple tasks by selecting the forward button and choosing 'task' instead of 'contact.' After selecting 'task' from the button, a New-Task/Search bar may appear for a user to search for a task, or create a new task (task-generation), to forward the message.

Further, the present application may provide a visual prioritized and chronological logging for media uploads. A section may be provided for display of a personalized real-time visual feed of rich media data-events, including, but not limited to: audio, video, imagery, documents, spreadsheets, presentations, and embedded links that may be uploaded by a user or imported by the service. The feed may be available in a few sorting forms, for example: prioritized (using an optimization algorithm) or chronological.

Further, the document editor in the tool-kit may include one or more options to allow the user to track the evolution of documents over time, quickly access drafts, and watch a playback of the document's evolution. In an embodiment, documents are paired with a document timeline, which may provide for vertical or horizontal scrolling (depending, for example, on the orientation of the document timeline) through all changes made to a document over time. Also provided with the document timelines may be draft markers, such as icons, that are automatically placed at points on the document timeline to indicate a new draft or revisions to a draft. Draft markers may be manually marked to start a new draft, such as by a user clicking a 'New Draft' button. Moreover, a user may select a draft marker from a document timeline to view content of the document as it existed at that time, before additional editing commenced for the session that followed. Document timelines may also include a playback button that allows users to instantly watch an animation of the evolution of the document, from the point specified (by clicking a place along the document timeline), up to the current version.

The present application further provides an ability to one-click switch between moving and stationary streaming. Live content streams (e.g., conversations, discussions) usually move as new data-events are published (new posts in a conversation/discussion), but are sometimes stationary and require the user to scroll up or down (depending on orientation formatting) to view new posts as the posts appear. Users may be allowed to choose between the two display methods by selecting or deselecting a 'Moving Stream' checkbox at the bottom of the stream. In an embodiment and when selected, the stream moves with new posts, and when deselected, the stream remains stationary even as new posts appear, thus requiring the user to scroll manually to view the new posts. The present application may further provide an ability to add/remove a pin (i.e. a visual image of a pin or similar graphical means of marking content—referred to throughout as "pin") to/from a message (with or without inclusive notes). In this embodiment, conversation/discussion messages are paired with options, such as an ability to mark the message to reply later, forward the message, add notes to the message and create a task (task-generation) from the message. One option, for example, 'Place a Pin', provides one or more controls to allow a user to add a marker to a message, which may then appear along the dialog (as described herein). Further, conversation/discussion messages, in coordination with the location of the pinned message(s), may be automatically outlined in a color that matches the pin. Message pins also include a small button, which, when selected, opens a small note field where the user can compose a quick note-to-self for later reference. To delete a message pin, a user may simply click the pin and drag it off the conversation/discussion dialog, from which it will disappear.

Further, the present application supports geographical task-pin mapping, from an API provider, such as GOOGLE MAPS, which allows the user to pinpoint locations by clicking a button, such as labeled 'Pins On,' that activates and deactivates an ability to drop and remove task-pins on locations by clicking and double-clicking, respectively.

Dropping a task-pin on a location allows the user to intend a task, for example, to add to the intent panel or to-do list, by specifying task parameters, such as what, where, who, when, related to what, involving the selected location. When a specified task is completed, the location where the task-pin appeared on the map will be replaced by a past-task-pin, from which the user can view any task-actions from the tool-kit associated with that task, such as collected information, uploaded images and communication.

The present application further supports providing activity timelines for public contributions. Public contributions, which may include collective user-generated content, may appear in three prominent places: a commentary section (e.g., a news reader for aggregating articles, blog-posts, feeds, and more published content from across the web), a questions section (e.g., a question forum for asking and answering questions in a forum-like format), and a contributions section (e.g., a help forum for asking and answering questions related to the system for help and support in a forum-like format). Users' activity in these sections may be measured and displayed along a timeline (where markers (icons) appear along the timeline at points in time where (a) user(s) generated data-events) on every relevant page.

Further, task-based music playlist creation, automation and cross services integration may be provided. For example, music-related APIs (e.g., via ITUNES MATCH, PANDORA, SPOTIFY) may be integrated such that users can add music tasks (play album 'x', song 'y', artist 'z') and playlists (listen to playlist 'x', including with an ability to select content for new playlists), from individual services and combinations of services, to their to-do list. In an embodiment, when a task/playlist is created, the user may designate that the task/playlist begin immediately, or a start-time may be selected and the specified music will play at the designated time, such that the task commences in the 'now' section of the to-do list.

In addition to music, film and television, and literature viewing is supported, such as via film, television, and literature-related APIs (e.g., via NETFLIX, HULU, AMAZON, or the like) for enabling users to add media tasks (play movie 'w', television show 'x', read book 'y', magazine 'z') to their to-do list. In an embodiment, when a 'watch' task is created, the user may designate that the task begin immediately, or a start-time may be selected and a specified movie/television show plays at the designated time, such that the task commences in the 'now' section of the to-do list. Further, reading tasks, for example, may be scheduled for incremental completion through a task cycle (a task that is repeated or continued at specified time-intervals until stopped or completed). One-click paid access may also be made available for accessing paid content from certain services, including through instant viewing (live streaming), and through instant access (immediate download to the system, wherein the content is made available for access in the user's 'collection' section—a dedicated entertainment section, with an 'available content' browsing section.

Additionally, users may be provided with options to choose to set a time interval aside to consume rich media (e.g., movies/videos, music, articles, or the like), and the service will use the optimization algorithm powering the prioritization and scheduling of task-based time intervals to choose the optimal time for the user to consume the rich-media of choice.

Further, task-based scheduling for meetings, including in-person, or online via an integrated system, may be provided. Users may be provided with options to set a time interval aside to conduct a meeting with an individual or group of individuals, and to use the optimization algorithm powering the prioritization and scheduling of task-based time intervals to choose the optimal time for the users to conduct their meeting. Meetings may be defined at any pre-set time interval where there is discussion regarding one or more tasks. Such a discussion may occur via text, audio, video conferencing or other suitable form. As a user decides to schedule a meeting, communication media preference and device availability are preferably factored for the user and the participant(s).

A discussion regarding plug-ins and external hardware/software components is now provided.

In an embodiment, an automated task-based plug-in may be introduced to the System for a variety of purposes, for example, 'curated searching' may provide users with a report-like aggregation of data/info catalogued from a variety of relevant sources determined through semantic analysis of the search input and web-search crawling. In an embodiment, a curated search plug-in may be made available for researching domain availability, as provided by aggregating and cataloging data from various domain-related services. For example, a plug-in is provided that a user can select, for example, from the new-task/search bar to determine the availability of a domain name. In an embodiment, a user may select an icon labeled 'Domain Check' from the new-task-bar, to then enter the potential domain name in the specified box, or type the task 'domain check' in the new-task/search bar followed by the potential domain name. Once catalogued, a search that generates a list of aggregated results is displayed in a report-like format that provides results from checking multiple extensions, such as '.com', '.co', '.nef', or the like. Moreover, a URL-based search may be performed to identify associated pages, corresponding registrars, "WHO-IS" records, such as for DNS and ownership data, Trademark Office registered trademark information, search engine optimization data, and/or popular service usernames (to pull associated usernames from a variety of public services, such as from FACEBOOK, TWITTER, GOOGLE+. In an embodiment, an option to one-click purchase (when available) a domain(s) through the user's choice registrar (presented through an aggregation of API integrations, for example), or an option to place a purchase-inquiry to connect to owner to deliver a direct offer through the system via a direct offer task.

Figure 7:
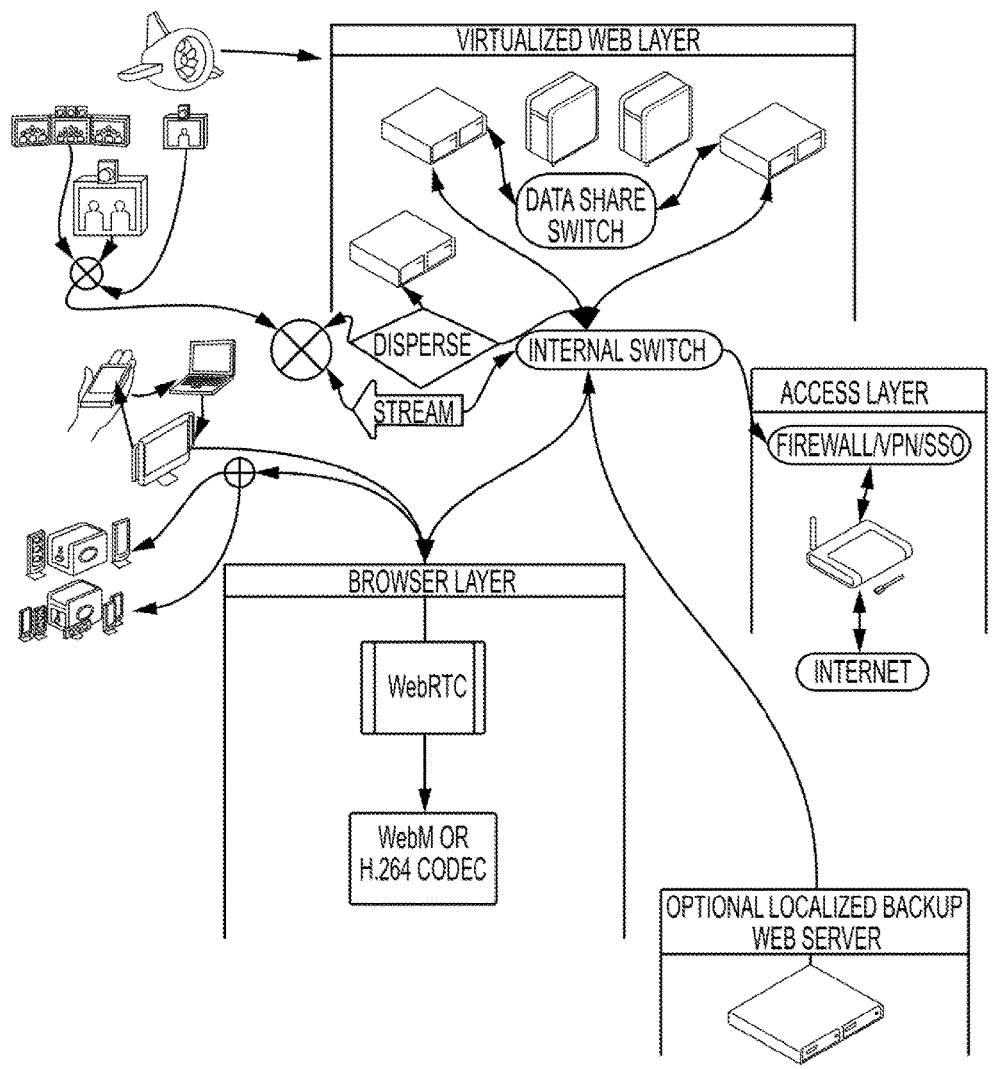
FIGS. 7 and 8 illustrate example hardware arrangements, in accordance with one or more embodiments.

FIG. 7 illustrates another example hardware arrangement, in accordance with an embodiment.

Figure 8:
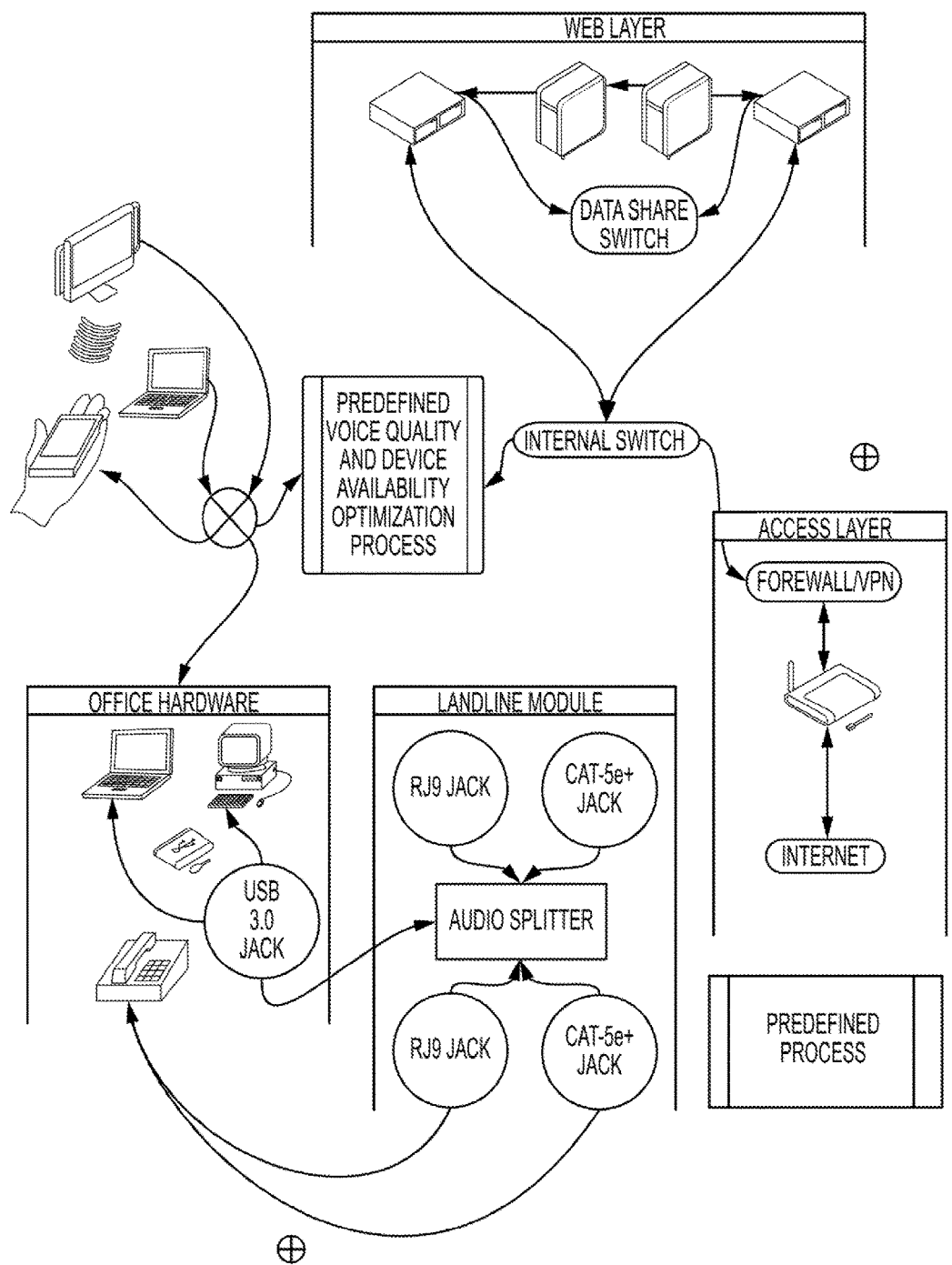

In an embodiment, an input-output device for optimal voice protocol selections and backwards compatible voice devices may be provided. For example, a mobile device examines cellular quality by analyzing reception bars and supplementary information provided by data-events. These data-events may be converted in order to analyze voice quality. Cellular data-events may be accessed via native API's or through short code carrier functionality access. Further, data-events and voice quality of the cellular services is monitored and compared to the VoIP quality (accessed through API's) and the proper protocol pertinent to voice quality is chosen when a user makes call from his/her mobile device. In an embodiment, a hardware module that supports a standard CAT-5 and/or a RJ-45 phone line connection is provided for a landline. Further, Ethernet/LAN connection, Wi-Fi support, and a USB 3.0 or Thunderbolt I/O or equivalent audio/data-event transfer and power charging cord that will connect to a computer-based peripheral device may be provided. Thereafter, a similar (or same) comparison algorithm may be provided for users working on a web browser running on a desktop or laptop that is connected to the landline module via the USB 3.0 or Thunderbolt I/O or equivalent data connection. Such a module allows users on the desktop or laptop not only to integrate data-events contained within landline calls into their browser-based application, but also to use the landline when optimal, based off of the comparison algorithm against VoIP protocols, for voice-based calls from the web browser where quality of connection and/or comfort of legacy handsets is ideal. Moreover, splitters (as shown in FIG. 8) may be employed for isolators (either optical or electronic) to preclude microcurrent feedback to the telephony System. There may be two types of splitter: (a) a splitter that is interposed between the receiver/headset of a user, and the telephone, and (b) a splitter that is interposed between the telephone and the enterprise telephony system. Audio signals may be obtained via a direct connection from the splitter to a USB or Thunderbolt I/O or equivalent socket, to enable voice-to-text translation and semantic interpretation through the browser-based application. Recording capability may further be built into the splitter.

Additionally, a wireless charging cube with near field communication for electrical energy signal detection for device status data-event collection may further be provided. Moreover, an output device that delivers a wireless charge to removable nodes that input into various/multiple devices may further be provided. In addition, a wireless display cube may be provided that includes an output device that relays display information to a removable node-input that attaches to a peripheral display for wireless display purposes. Further, a conference cube that includes a wireless headphone/speakerphone splitter for conference call integration with recording functionality may be provided. This cube may utilize Wi-Fi, audio playback via speakers, audio recording via microphone, and wireless charging. Alternatively (or in addition), near field communication enabled adhesive sensors/labels for analog item-based and/or location-based tasks (for individual or group access).

FIGS. 9A-9H are flowcharts that, when combined, illustrate example steps associated with an optimization algorithm in accordance with an embodiment. The steps associated with the example flowcharts 9A-9H provide a user with a prioritized list of tasks to be completed. Factors contribute to a "Factor Culmination" that represents the respective parameters, and which are provided respective 'X' values. The determined value of a task is then measured against other tasks associated with a user, to generate prioritization by which the To-Do List may be presented in a format akin to an 'Order of Operations'.

Continuing with reference to FIGS. 9A-9H, '1-7x' represent the order of priority for the seven Parameters: Where, How, Why, For What, What, Who, and When. These factors are listed in accordance with each Factor Culmination being prioritized in ascending order, in which the first factor listed (from top to bottom) is the factor of the greatest value within the respective parameter.

A ranking system is a special case of ponderation where the resulting numerical score provides a rank ordering of an organization's preference. An integer weighting scheme is a special embodiment of value tradeoff when integer weights (e.g., 2x, 5x, or integer-x) are used as a measure of relative importance/relevance.

Figure 9A:
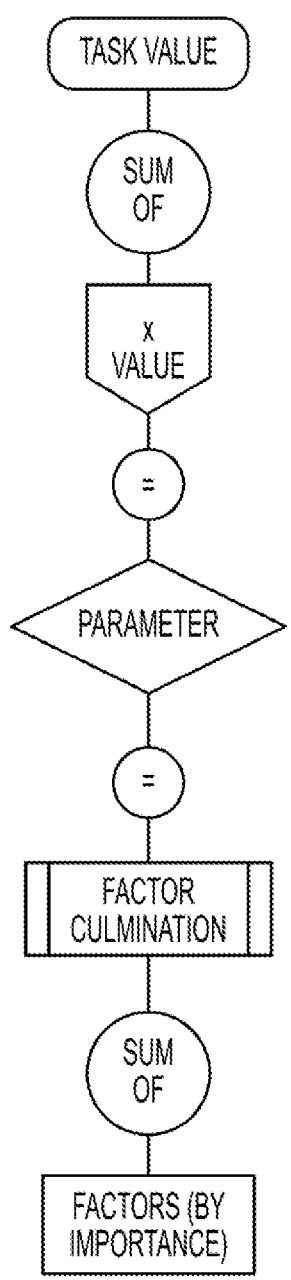
FIGS. 9A-9H are flow charts illustrating steps associated with task value determinations, in accordance with an embodiment.
Figure 9B:
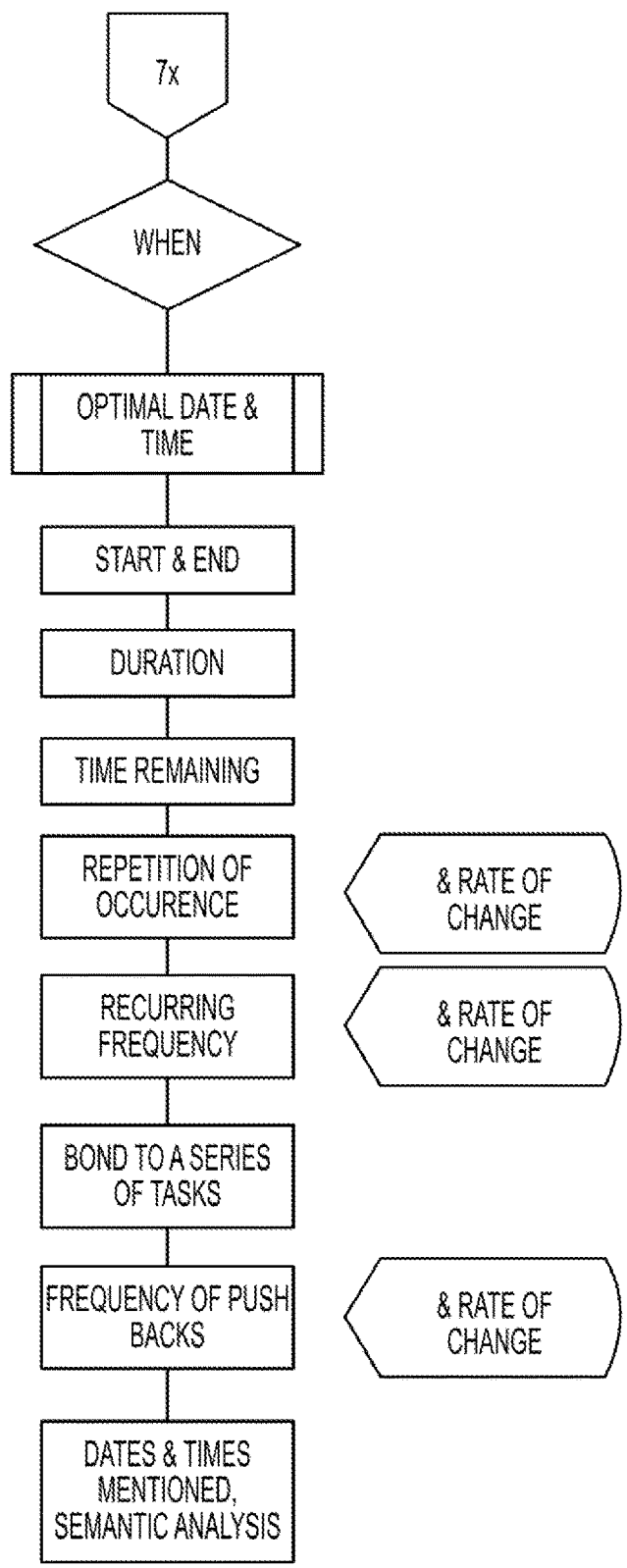

As set forth in FIG. 9B, a parameter representing "When" is assigned a value of 7x. Related information, including optimal date and time is considered, for example, as a function of start and end dates, duration, time remaining, repetition of occurrence (and rate of change), recurring frequency (and rate of change), bond to a series of tasks, frequency of push backs (and rate of change), and dates and times mentioned (and determined as a function of semantic analysis and interpretation).

Figure 9C:
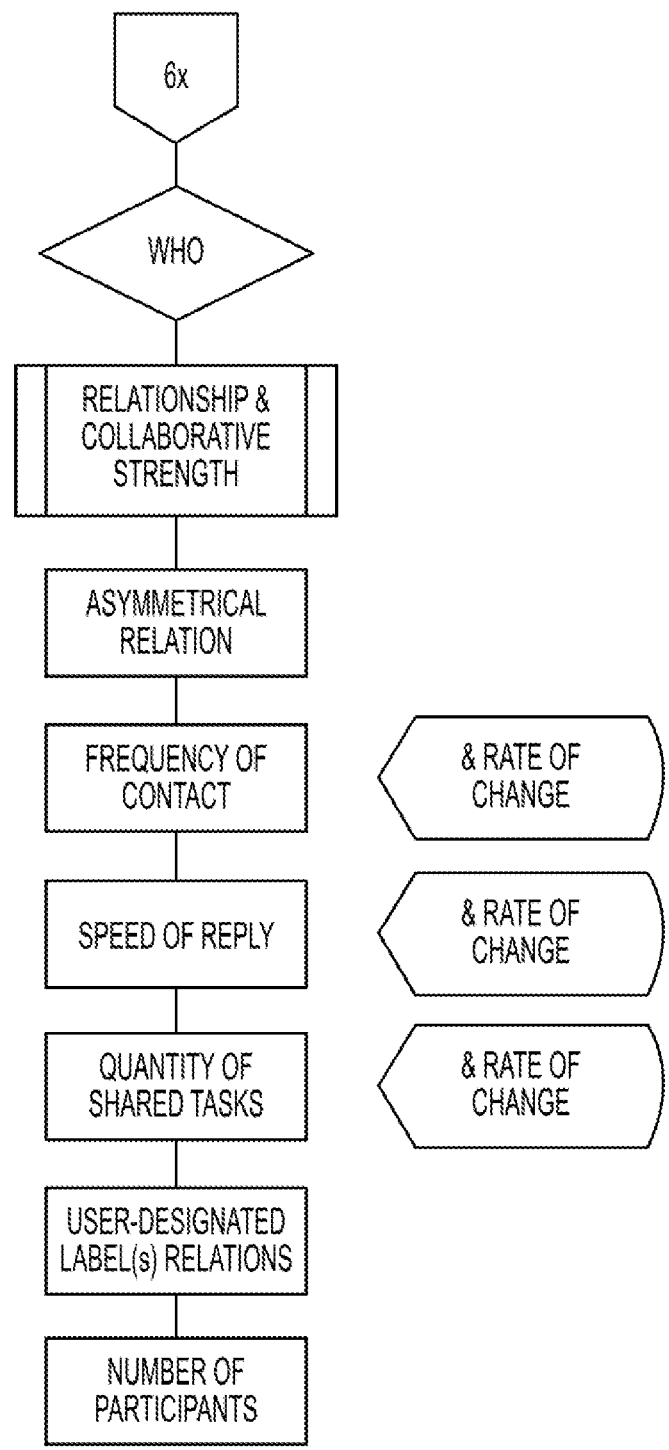

As set forth in FIG. 9C, a parameter representing "Who" is assigned a value of 6x. Related information, including relationship and collaborative strength is considered, for example, as a function of asymmetrical relation, frequency of contact (and rate of change), speed of reply (and rate of change), quantity of shared tasks (and rate of change), user-designated label(s) relations, and number of participants.

Figure 9D:
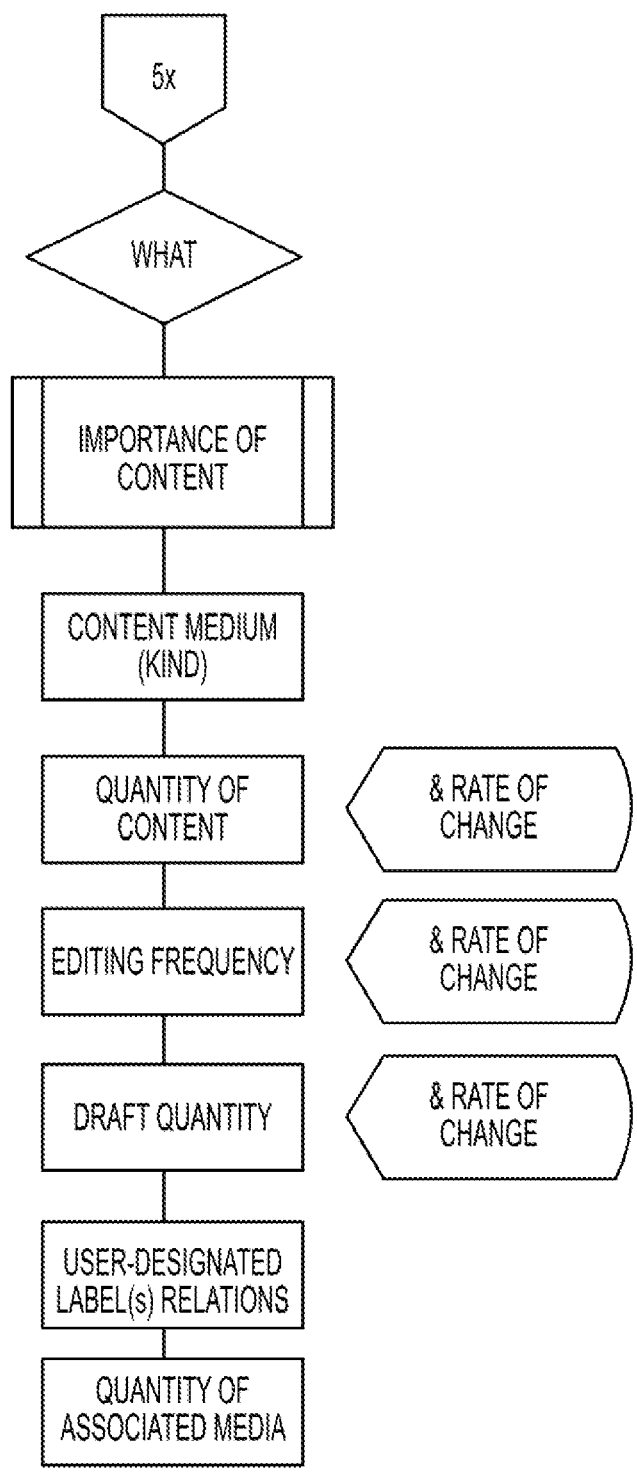

As set forth in FIG. 9D, a parameter representing "What" is assigned a value of 5x. Related information, including importance of content strength is considered, for example, as a function of content medium {kind}, quantity of content (and rate of change), editing frequency (and rate of change), draft quantity (and rate of change), user-designated label(s) relations, and quantity of associated media.

Figure 9E:
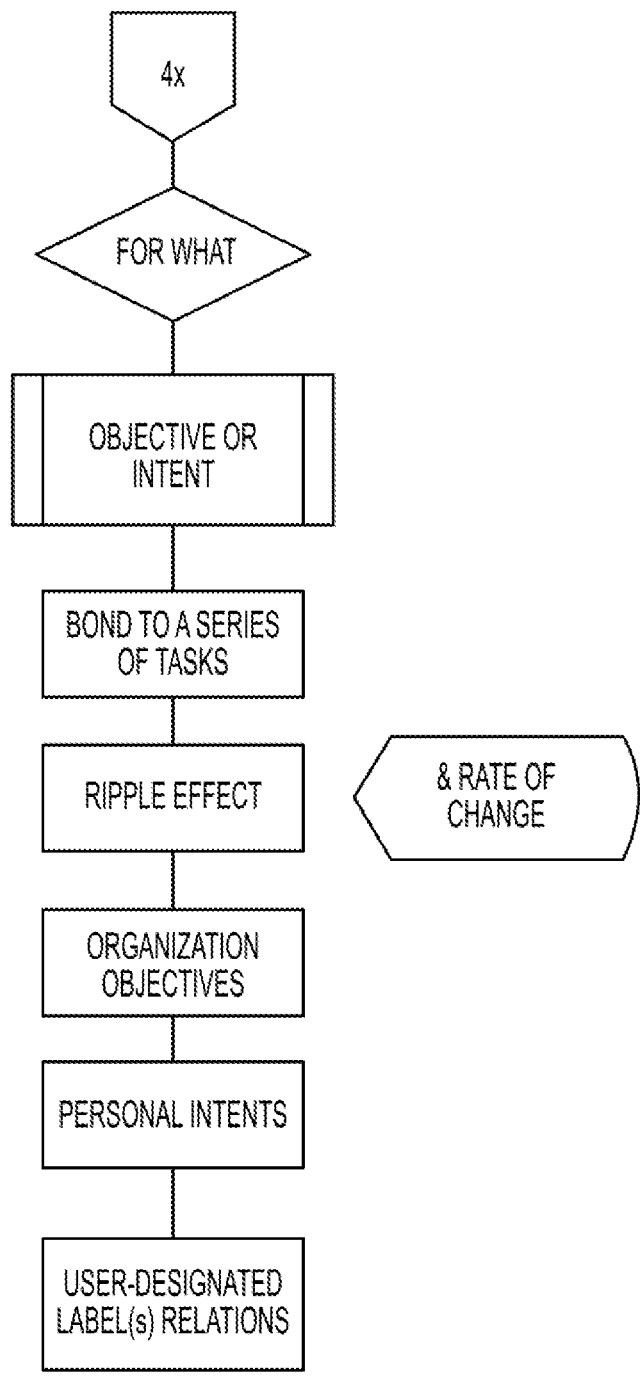

As set forth in FIG. 9E, a parameter representing "For What" is assigned a value of 4x. Related information, including objective or intent is considered, for example, as a function of bound to a series of tasks, ripple effect (and rate of change), organization objectives, personal intents, and user-designated label(s) relations.

Figure 9F:
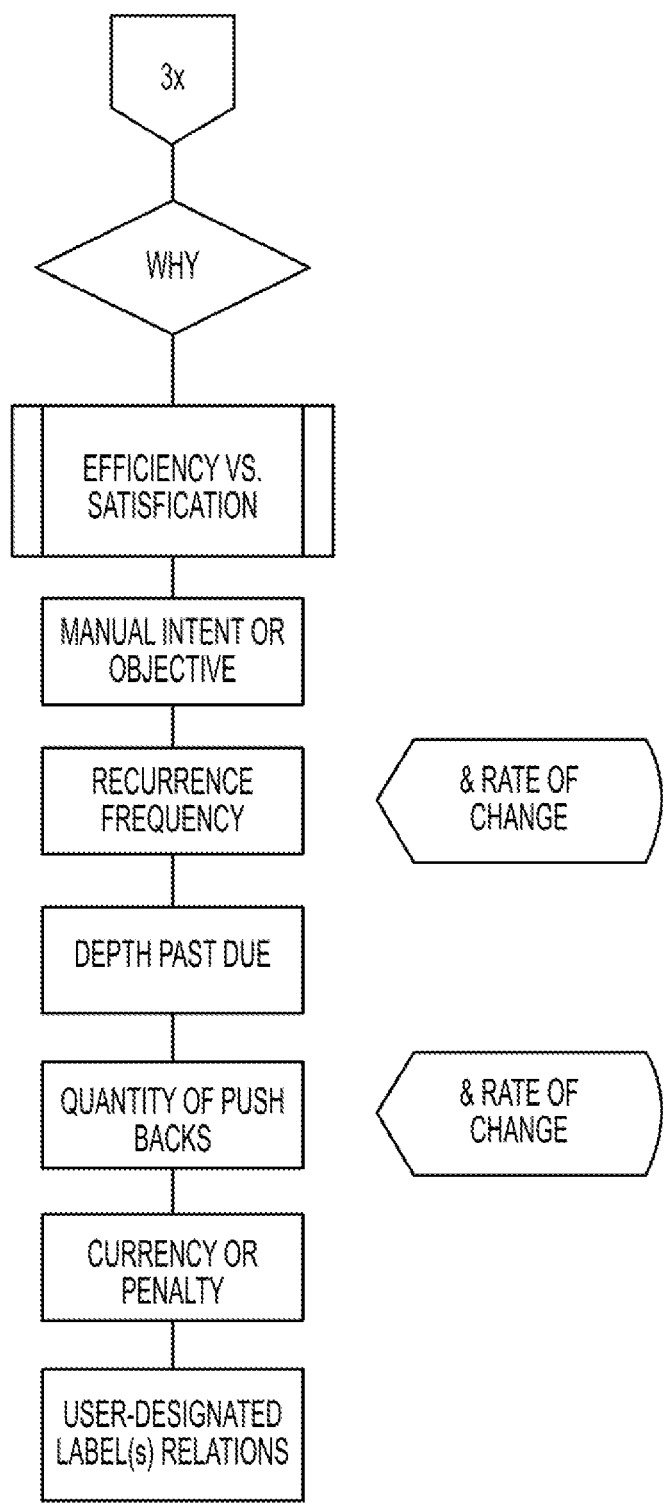

As set forth in FIG. 9F, a parameter representing "Why" is assigned a value of 3x. Related information, including efficiency vs. satisfaction, is considered, for example, as a function of manual intent or objective, recurrence frequency (and rate of change), depth past due, quantity of push backs (and rate of change), currency or penalty, and label(s) relations.

Figure 9G:
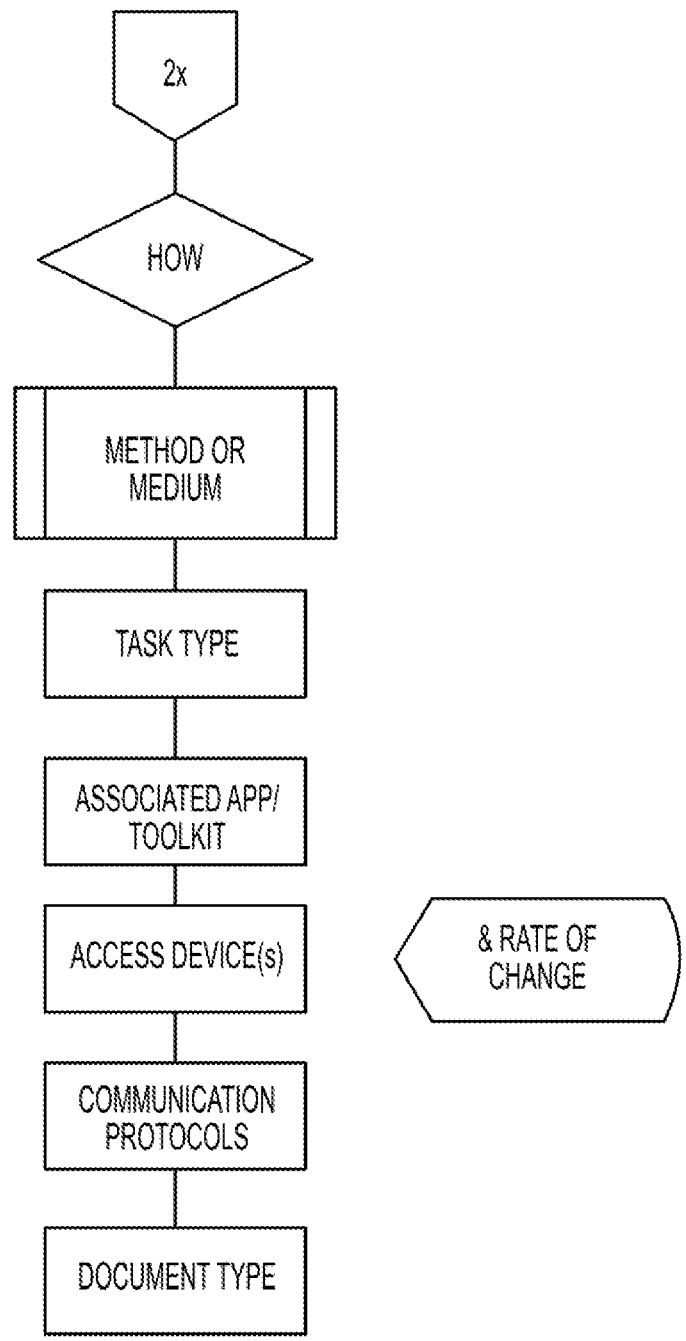

As set forth in FIG. 9G, a parameter representing "How" is assigned a value of 2x. Related information, including method or medium is considered, for example, as a function of task type, associated app/toolkit, access device(s) (and rate of change), communication protocols, and document type.

Figure 9H:
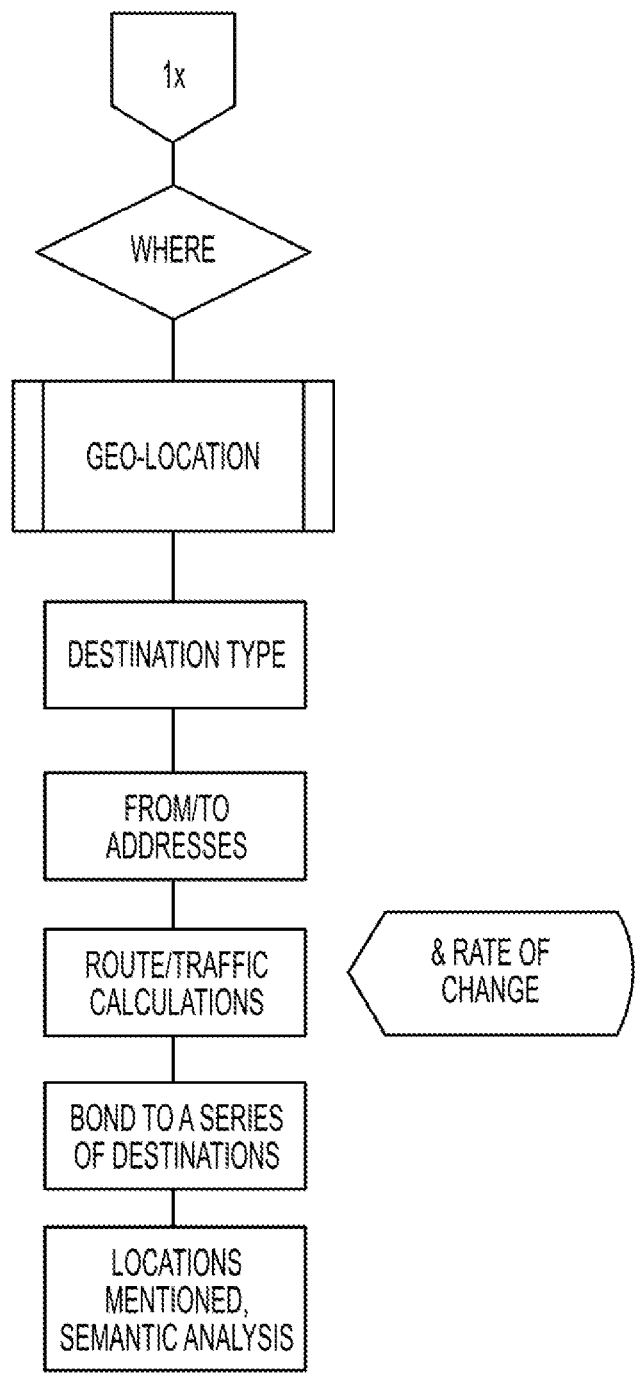

As set forth in FIG. 9H, a parameter representing "Where" is assigned a value of 1x. Related information, including geo-location is considered, for example, as a function of destination type, from/to addresses, route/traffic calculations (and rate of change), bond to a series of destinations, locations mentioned, and semantic analysis {intepretation}.

Thus, as shown and described herein, a plurality of software and/or hardware tools are provided to take advantage of real-time push technologies to greatly improved collaboration across many types of communication media. The communications portal provides a true breakthrough for organizational proficiency and efficiency in the internet-based communications sector. The teachings herein provide for reduction, which remove barriers that block task-action, with prioritization providing an active, automated to-do list for everything that enters and exits users' workflow, and consolidation, for pairing tasks with the tools needed for completion thereof.

A core tool set may be complemented by a revolutionary task manager fueled by a prioritization algorithm that compares time intervals spent on tasks that are of similar purpose (size or end result), distance and time between physical locations, and real-time prioritization of communication access to maximize the proficiency and efficiency of task completion. This is the aspect that can be compared to a person having a personal assistant who decides what you need to do and when you need to do it, with timesaving goals in mind.

Although the present application is described and shown in relation to particular embodiments thereof, many other variations and modifications and other uses will become apparent to those skilled in the art. Thus, various embodiments and variations are shown and described herein, and it is preferred, therefore, that the present invention be limited not by the specific disclosure herein.

What is claimed is:

1. A method, comprising:
storing on one or more processor readable media that are operatively coupled to one or more processors, at least one database comprising:
electronic user information representing a plurality of users;
electronic task information representing a plurality tasks respectively associated with at least one of the plurality of users; and
electronic task action information representing a plurality of actions respectively associated with each of at least one of the plurality of tasks;
prioritizing, by the one or more processors, at least some of the plurality of tasks associated with a first user of the plurality of users;
prioritizing, by the one or more processors, at least some of the plurality of actions respectively associated with the at least some of the plurality of tasks;
generating, by the one or more processors, a first to-do list, wherein the first to-do list includes the prioritized tasks associated with the first user;
providing, by the one or more processors to a first computing device operated by the first user, the first to-do list;
prioritizing, by the one or more processors, at least some of the plurality tasks associated with a second user of the plurality of users;
prioritizing, by the one or more processors, at least some of the plurality of actions respectively associated with the at least some of the plurality of tasks associated with the second user;
generating, by the one or more processors, a second to-do list, wherein the second to-do list includes the prioritized tasks associated with the second user;
providing, by the one or more processors to a second computing device operated by the second user, the second to-do list;
receiving, by the one or more processors, first electronic time-based data event information representing first data that are associated with at least one of the at least some of the plurality of tasks;
reprioritizing at least one of the at least some of the plurality of tasks and the at least some of the plurality of respective actions, based on both (a) the first electronic time-based electronic data information and (b) a ripple effect analysis configured to avoid chain reaction delays, in order to obtain organizational-level priority optimization;
modifying, by the one or more processors, the first to-do list based at least one the reprioritizing;
providing, by the one or more processors, to the first computing device the modified first to-do list;
at least one of the at least some of the plurality of tasks associated with the second user and the at least some of the plurality of actions are associated with the second user, based on both (a) the first electronic time-based electronic data information and (b) said ripple effect analysis;
providing, by the one or more processors, to the second computing device the modified second to-do list;
wherein at least one of said plurality of tasks is associated with both said first user and said second user; and
wherein said ripple effect analysis is conducted in a manner that avoids conflict in the performance of said tasks by both said first user and by said second user.

2. The method of claim 1, wherein the first data event information represents one of:
information received via an application programming interface;
information received via data entry by the first computing device;
information received via a communication protocol;
information received via an analog communication source;
information received via voice over IP;
information received via short message service; and
information received via videoconferencing.

3. The method of claim 1, further comprising providing, by the one or more processors to the first computing device, a communications transcript based at least on the first data event information.

4. The method of claim 1, wherein at least one of the prioritizing and the reprioritizing is performed as a function of one or more of time, one or more users associated with at least one of the at least some of the plurality tasks, and at least one criterion received by the first computing device.

5. The method of claim 1, further comprising determining, by the one or more processors based at least on the first data event information, a respective application programming interface for receiving the first data, and accessing, by the one or more processors, the first data as function of the respective application programming interface.

6. The method of claim 1, further comprising formatting, by the one or more processors, the first to-do list to include selectable hyperlinks that, when selected by the first user operating the first computing device, provide at least one tool for completing at least one of the at least some of the plurality of respective actions.

7. The method of claim 1, further comprising transmitting, by the one or more processors to at least one second computing device respectively operated by at least one second user, electronic information associated with the first data event information.

8. The method of claim 1, further comprising optimizing, by the one or more processors, allocation of time for completing at least one of the at least some of the plurality of respective actions.

9. The method of claim 1, further comprising:
receiving, by the one or more processors, an electronic contact list that includes contact information for a plurality of individuals, wherein the electronic contact list is associated with the first user;
calculating, by the one or more processors, a relationship strength based at least on a communication history associated with the first user;
sorting, by the one or more processors, the electronic contact list as a function of the relationship strength; and
providing the sorted electronic contact list to the first computing device.

10. A system, comprising:
one or more processor readable media that are operatively coupled to one or more processors;
at least one database stored on the one or more processor readable media, the at least one database including:

electronic user information representing a plurality of users;

electronic task information representing a plurality tasks respectively associated with at least one of the plurality of users; and electronic task action information representing a plurality of actions respectively associated with each of at least one of the plurality of tasks;

wherein the one or more processors is programmed and configured to:

prioritize at least some of the plurality tasks associated with a first user of the plurality of users;

prioritize at least some of the plurality of actions respectively associated with the at least some of the plurality of tasks;

generate a first to-do list, wherein the first to-do list includes the prioritized tasks associated with the first user;

provide to a first computing device operated by the first user, the first to-do list;

prioritize at least some of the plurality tasks associated with a second user of the plurality of users;

prioritize at least some of the plurality of actions respectively associated with the at least some of the plurality of tasks associated with the second user;

generate a second to-do list, wherein the second to-do list includes the prioritized tasks associated with the second user;

provide to a second computing device operated by the second user the second to-do list;

receive first electronic data event information representing a sending or receiving of first data that are associated with at least one of the at least some of the plurality of tasks;

reprioritize at least one of the at least some of the plurality tasks and the at least some of the plurality of respective actions based on both (a) the first electronic data event information, and (b) a ripple effect analysis configured to avoid chain reaction delays, in order to obtain organizational-level priority optimization;

modify the first to-do list based at least one the reprioritizing;

provide to the first computing device the modified first to-do list;

wherein the one or more processors is further programmed and configured to:

reprioritize at least one of the at least some of the plurality tasks associated with the second user and the at least some of the plurality of respective actions respectively associated with the at least some of the plurality of tasks associated with the second user based on both (a) the first electronic data event information and (b) a ripple effect analysis configured to avoid chain reaction delays, in order to obtain organizational-level priority optimization;

modify the second to-do list based at least one the reprioritizing;

provide to the second computing device the modified second to-do list; and wherein at least one of said plurality of tasks is associated with both said first user and said second user; and wherein said ripple effect analysis is conducted in a manner that avoids conflict in the performance of said tasks by both said first user and by said second user.

11. The system of claim 10, wherein the first data event information represents one of:

information received via an application programming interface;

information received via data entry by the first computing device;

information received via a communication protocol;

information received via an analog communication source;

information received via voice over IP;

information received via short message service; and information received via videoconferencing.

12. The system of claim 10, wherein the one or more processors is further programmed and configured to provide to the first computing device, a communications transcript based at least on the first data event information.

13. The system of claim 10, wherein at least one of the prioritizing and the reprioritizing is performed as a function of one or more of time, one or more users associated with at least one of the at least some of the plurality tasks, and at least one criterion received by the first computing device.

14. The system of claim 10, wherein the one or more processors is further programmed and configured to determine, based at least on the first data event information, a respective application programming interface for receiving the first data, and accessing, by the one or more processors, the first data as function of the respective application programming interface.

15. The system of claim 10, wherein the one or more processors is further programmed and configured to format the first to-do list to include selectable hyperlinks that, when selected by the first user operating the first computing device, provide at least one tool for completing at least one of the at least some of the plurality of respective actions.

16. The system of claim 10, wherein the one or more processors is further programmed and configured to transmit to at least one second computing device respectively operated by at least one second user, electronic information associated with the first data event information.

17. The system of claim 10, wherein the one or more processors is further programmed and configured to optimize allocation of time for completing at least one of the at least some of the plurality of respective actions.

18. The system of claim 10, wherein the one or more processors is further programmed and configured to:

receive an electronic contact list that includes contact information for a plurality of individuals, wherein the electronic contact list is associated with the first user;

calculate a relationship strength based at least on a communication history associated with the first user;

sort the electronic contact list as a function of the relationship strength; and provide the sorted electronic contact list to the first computing device.

* * * * *